United States Patent
Koenig et al.

(10) Patent No.: US 11,353,135 B1
(45) Date of Patent: Jun. 7, 2022

(54) MAGNETIC FLUIDIC VALVES AND RELATED SYSTEMS AND METHODS

(71) Applicant: Facebook Technologies, LLC, Menlo Park, CA (US)

(72) Inventors: Robert B. Koenig, Menlo Park, CA (US); Massimiliano Di Luca, Redmond, WA (US); Jan Andrzej Walczak, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 114 days.

(21) Appl. No.: 16/778,303

(22) Filed: Jan. 31, 2020

Related U.S. Application Data

(60) Provisional application No. 62/812,967, filed on Mar. 2, 2019.

(51) Int. Cl.
*F16K 31/06* (2006.01)
*F16K 99/00* (2006.01)

(52) U.S. Cl.
CPC ...... *F16K 31/0679* (2013.01); *F16K 99/0046* (2013.01)

(58) Field of Classification Search
CPC .................. F16K 31/0679; F16K 99/0046
See application file for complete search history.

(56) References Cited

U.S. PATENT DOCUMENTS

| | | | | | |
|---|---|---|---|---|---|
| 4,253,493 | A | * | 3/1981 | English | F01L 9/20 137/625.18 |
| 5,582,207 | A | * | 12/1996 | Gilbert | B62D 5/0837 137/625.23 |
| 6,899,314 | B2 | * | 5/2005 | Ott | F16K 31/0606 251/129.14 |
| 9,016,305 | B2 | * | 4/2015 | Morris | F16K 27/003 137/271 |
| 9,046,187 | B2 | * | 6/2015 | Wygnanski | F16K 31/082 |
| 2017/0356566 | A1 | * | 12/2017 | Bentz | F16K 27/0245 |

* cited by examiner

*Primary Examiner* — Eric Keasel
(74) *Attorney, Agent, or Firm* — FisherBroyles, LLP

(57) ABSTRACT

Magnetic fluidic valves of the present disclosure may include a valve body having at least one cavity therein, a ferromagnetic gate transmission element disposed within the cavity, an inlet port, an outlet port, a permanent magnet configured to bias the gate transmission element to a closed position, and an electromagnetic coil configured to, upon actuation, overcome a magnetic force acting on the gate transmission element from the permanent magnet. The gate transmission element may be configured to move from the closed position blocking the inlet port to an open position unblocking the inlet port upon actuation of the electromagnetic coil. Various other fluidic systems and methods are also disclosed.

13 Claims, 19 Drawing Sheets

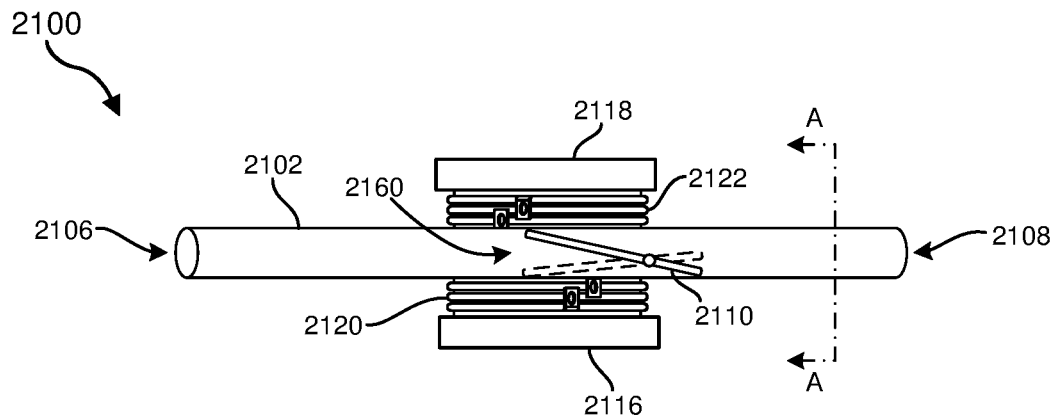
FIG. 21A
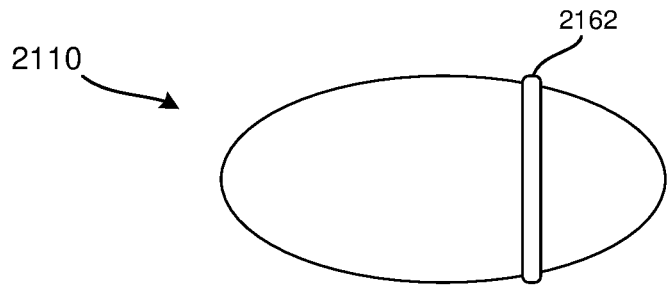
FIG. 21B
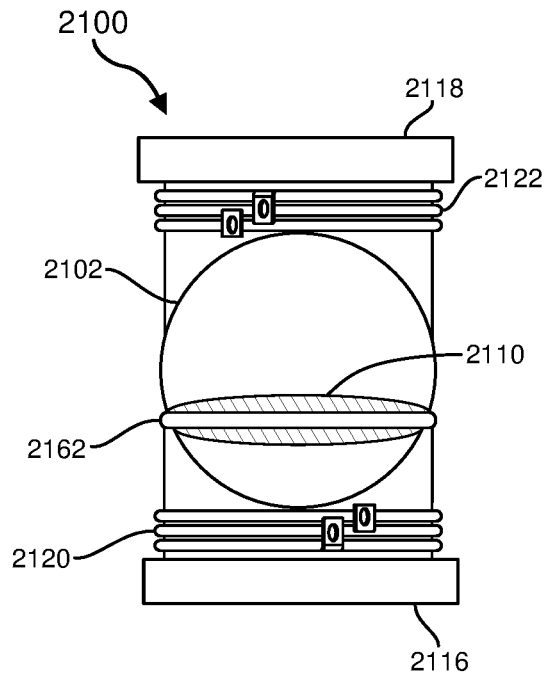 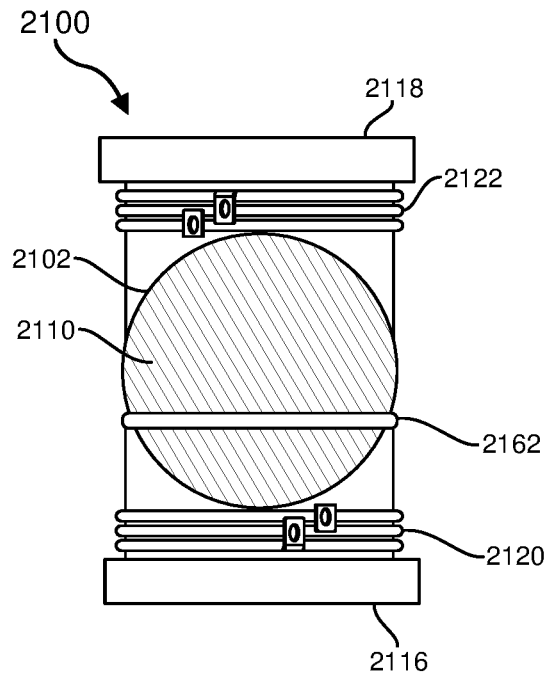
FIG. 21C  FIG. 21D

MAGNETIC FLUIDIC VALVES AND RELATED SYSTEMS AND METHODS

CROSS-REFERENCE TO RELATED APPLICATION

This application claims priority to U.S. Provisional Patent Application Ser. No. 62/812,967, titled "MICROFLUIDIC VALVES AND RELATED SYSTEMS AND METHODS," filed 2 Mar. 2019, the entire disclosure of which is hereby incorporated by reference.

BRIEF DESCRIPTION OF DRAWINGS

The accompanying drawings illustrate a number of example embodiments and are a part of the specification. Together with the following description, these drawings demonstrate and explain various principles of the present disclosure

FIGS. 21A-21D illustrate various views of a fluidic valve and components thereof, according to at least one additional embodiment of the present application.

Figure 1:
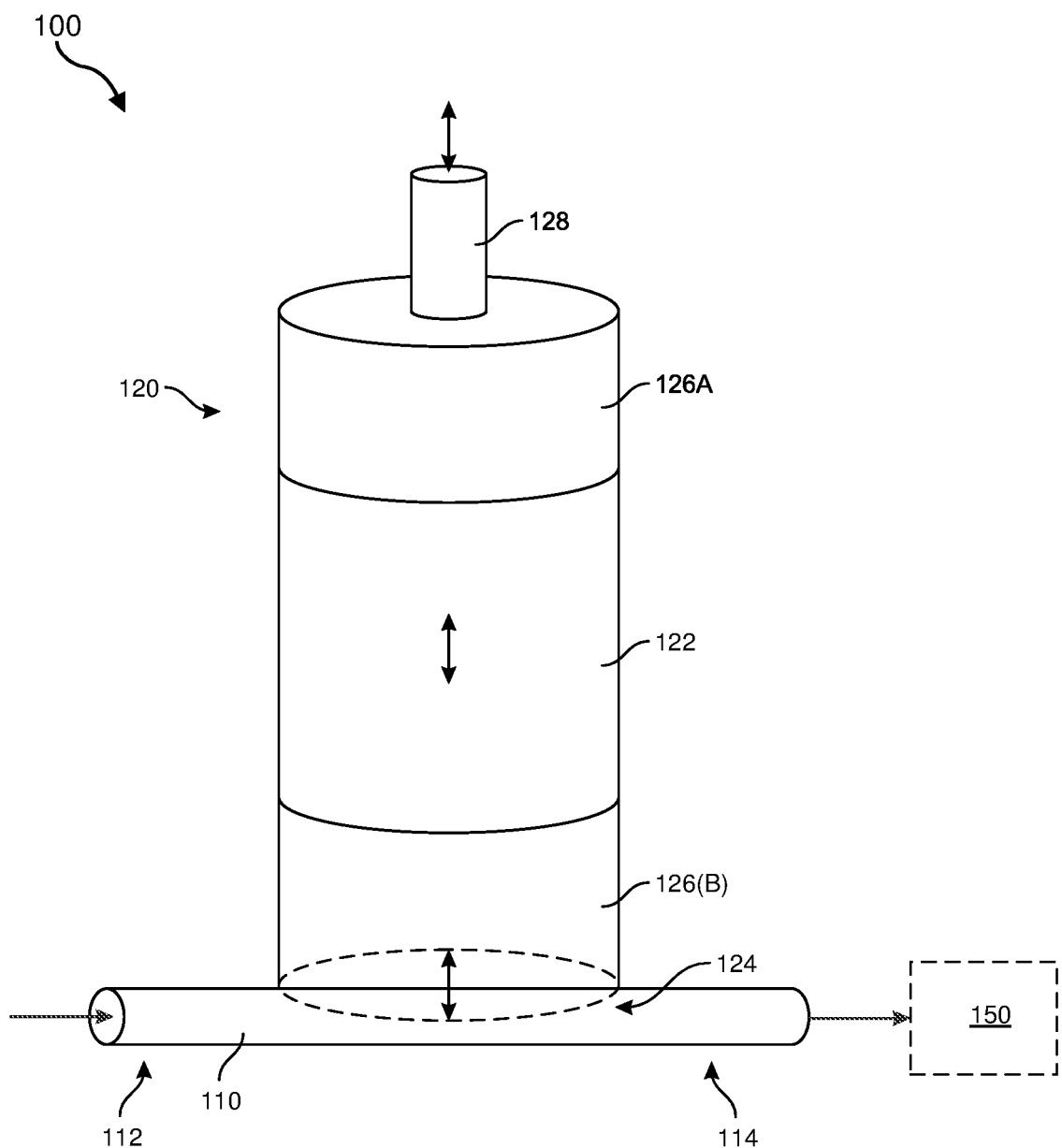
FIG. 1 is an illustration of an example fluidic control system that may be used in connection with embodiments of this disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

Fluidic systems are mechanical systems that involve the flow of fluids. Fluidic systems can be used in many different fields, such as biomedical, chemical, genetic, biochemical, pharmaceutical, haptics, and other fields. A fluidic valve is a basic component of fluidic system and may be used for stopping, starting, or otherwise controlling flow of a fluid in a fluidic system. Conventional fluidic valves may be actuated via fluid pressure, with a mechanical lever or knob, with a piezoelectric material, or a spring-loaded mechanism, for example.

Microfluidic systems are small mechanical systems that may also be useful in a variety of fields. Manufacturing of reusable and reliable valves at the scale of microfluidic systems can be challenging. For example, it can be difficult to form the valves at such a small scale in a manner that reliable seals (e.g., at the valve seat, between components of the valve, etc.) may be made with the valves. Additionally, moving parts in small mechanisms like microfluidic valves can be fragile and difficult to control without causing damage. Moreover, actuation mechanisms for reliably and fully closing and/or opening the valves often require a significant amount of energy.

Traditionally, fluid-powered actuators may be controlled by the intermittent pressure differentials supplied thru a valve. Conventional valves are typically solenoid-based devices requiring electrical power to actuate (and often to maintain position). The valves are often relatively large and it can be difficult to fit several valves in small spaces. Therefore, if several valves are required, they are often mounted away from the actuators, which are then driven thru long, often tangled, lengths of tubing/piping.

Accordingly, the present disclosure recognizes a need and provides solutions for improved fluidic valves and systems and methods for controlling a fluid flow in fluidic systems.

Figure 17:
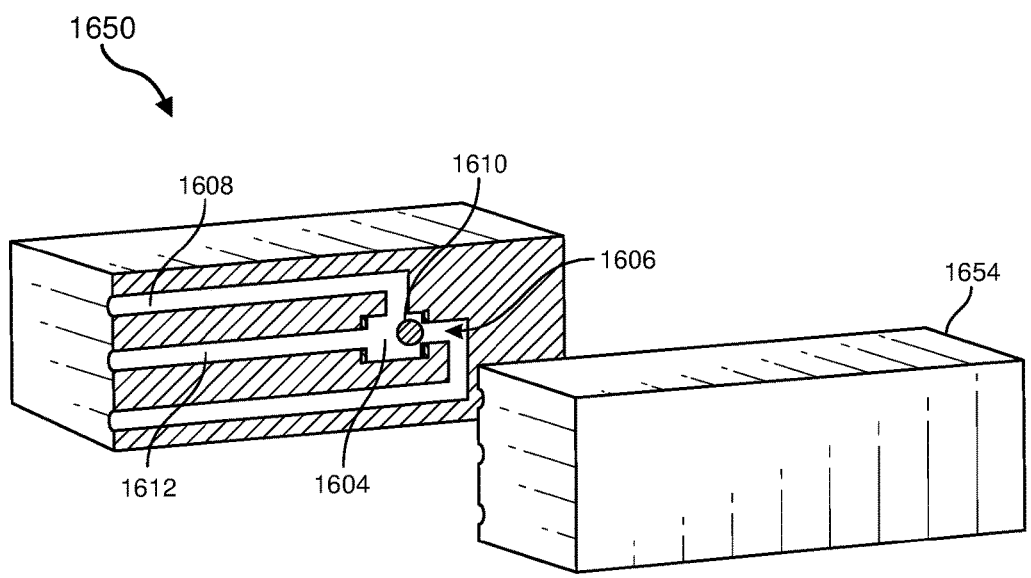
FIG. 17 is an exploded perspective view of a pneumatic module of the fluidic valve of FIG. 16.
Figure 18A:
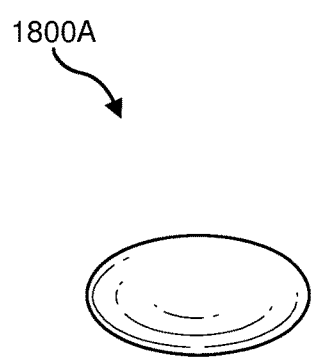
FIGS. 18A-18C illustrate various gate transmission elements that may be employed in fluidic valves, according to some embodiments of the present disclosure.
Figure 18B:
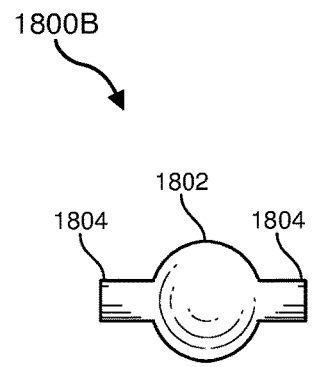
Figure 18C:
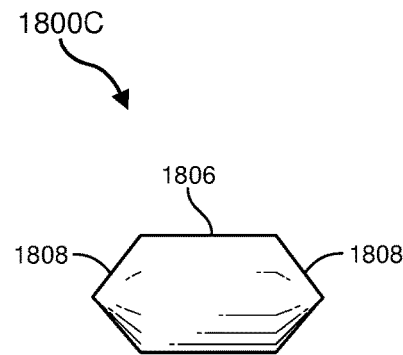
Figure 19A:
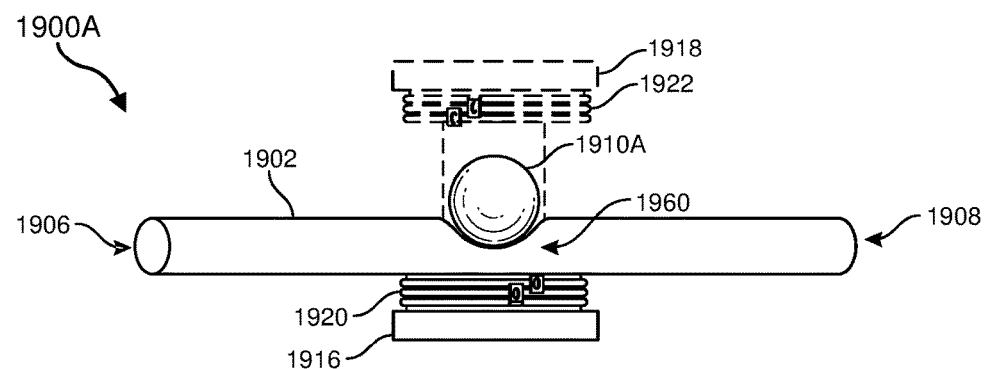
FIG. 19A illustrates a fluidic valve according to at least one additional embodiment of the present application.
Figure 19B:
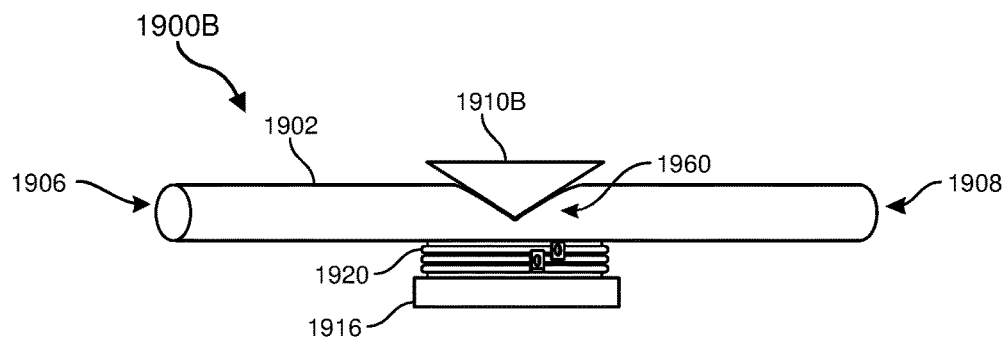
FIG. 19B illustrates a fluidic valve according to at least one further embodiment of the present application.
Figure 20:
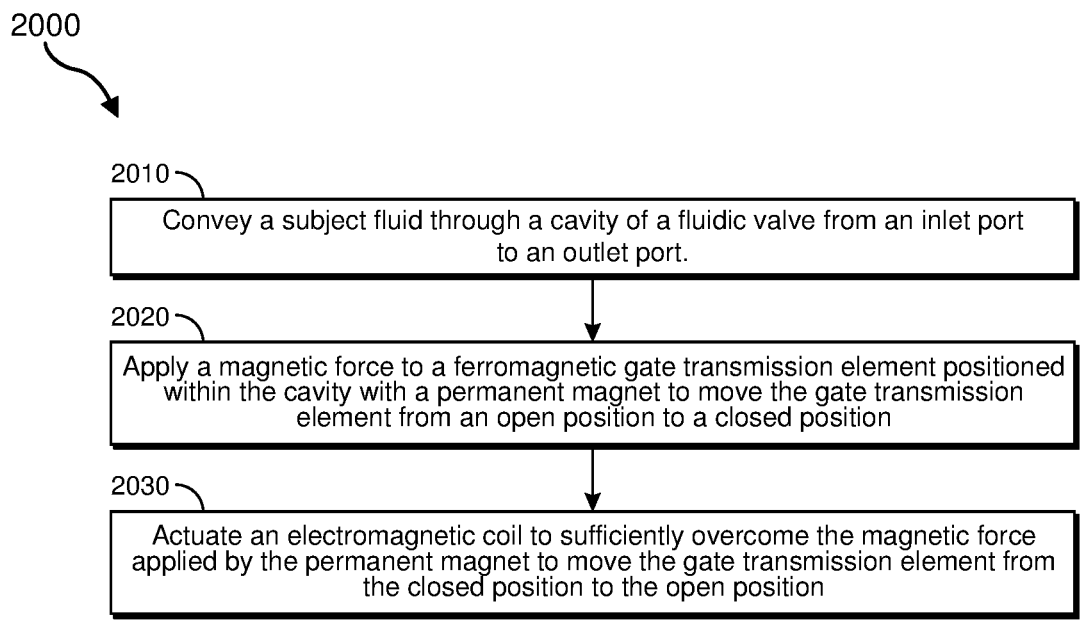
FIG. 20 is a flow diagram illustrating a method of controlling fluid flow according to at least one embodiment of the present disclosure.

The following will provide, with reference to FIG. 1, detailed descriptions of fluidic valves. With reference to FIGS. 2-19, the following will provide detailed descriptions of various example magnetic fluidic valves, magnetic fluidic systems, and components thereof. Specifically, the following will provide, with reference to FIGS. 2-8, detailed descriptions of various example magnetic fluidic valves. With reference to FIGS. 9-12, the following will provide detailed descriptions of magnetic fluidic valves that can be attached to a flat surface, such as an electronic circuit that may include a layer of isolating material between two layers of conductive material. With reference to FIGS. 13-17, the following will provide detailed descriptions of magnetic fluidic valves having a fluidic module that can be physically separated from and/or coupled to an electronics module. With reference to FIGS. 18A-18C, the following will provide detailed descriptions of various example gate transmission elements that may be employed in magnetic fluidic valves. With reference to FIGS. 19A and 19B, the following will provide detailed descriptions of additional example magnetic fluidic valves. With reference to FIG. 20, the following will provide detailed descriptions of methods of controlling flow of a subject fluid in a magnetic fluidic system. With reference to FIGS. 21A-21D, the following will provide detailed descriptions of further example magnetic fluidic valves. With reference to FIGS. 22-27, the following will provide detailed descriptions of artificial-reality systems and components that may be used in connection with embodiments of this disclosure.

The present disclosure is generally directed to fluidic valves (e.g., microfluidic valves) that employ magnetism and electromagnetism to move a ball between open and closed positions. In various embodiments, the magnetic fluidic valves may be suitable for implementation on a micro scale (e.g., fitting within an area of less than about 1000 $mm^2$, less than about 500 $mm^2$, or less than about 125 $mm^2$), such as for use with fluidic haptics devices in artificial-reality systems or other haptics applications. In some examples, this arrangement may allow for the physical separation of fluidic components of a fluidic valve from electrical and/or magnetic components of the fluidic valve. Once a gate element of the valve is moved into position, a valve state (e.g., open or closed) may be maintained by magnetic force from a permanent magnet without electrical input. In addition, embodiments of the present disclosure may provide magnetically reversible and/or adjustable fluidic valves. The fluidic valves of the present disclosure may be bi-stable (e.g., requiring no input energy to maintain two distinct states or positions).

The present disclosure may include haptic fluidic systems that involve the control (e.g., stopping, starting, restricting, increasing, etc.) of fluid flow through a fluid channel. The control of fluid flow may be accomplished with a fluidic valve. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism 150, another fluid channel, or a fluid reservoir.

Fluidic valve 100 may include a gate 120 for controlling the fluid flow through the fluid channel 110. The gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to the gate transmission element 122 may result in opening the restricting region 124 to allow or increase flow through the fluid channel 110. The force, pressure, or displacement applied to the gate transmission element 122 may be referred to as a gate force, gate pressure, or gate displacement. The gate transmission element 122 may be a flexible element (e.g., an elastomeric membrane, a diaphragm, etc.), a rigid element (e.g., a movable piston, a lever, a ball, etc.), or a combination thereof (e.g., a movable piston or a lever coupled to an elastomeric membrane or diaphragm).

As illustrated in FIG. 1, the gate 120 of the fluidic valve 100 may include one or more gate terminals, such as an input gate terminal 126A and an output gate terminal 126B (collectively referred to herein as "the gate terminals 126") on opposing sides of the gate transmission element 122. The gate terminals 126 may be elements for applying a force (e.g., pressure) to the gate transmission element 122. By way of example, the gate terminals 126 may each be or include a fluid chamber adjacent to the gate transmission element 122. Alternatively or additionally, one or more of the gate terminals 126 may include a solid component, such as a lever, screw, or piston, that is configured to apply a force to the gate transmission element 122. In additional embodiments, one or more of the gate terminals 126 may be or include a magnet (e.g., a permanent magnet and/or an electromagnetic coil) configured to apply a magnetic force to the gate transmission element 122.

In some examples, a gate port 128 may be in fluid communication with the input gate terminal 126A for applying a positive or negative fluid pressure within the input gate terminal 126A. A control fluid source (e.g., a pressurized fluid source, a fluid pump, etc.) may be in fluid communication with the gate port 128 to selectively pressurize and/or depressurize the input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward the restricting region 124, resulting in a corresponding pressurization of the output gate terminal 126B. Pressurization of the output gate terminal 126B may, in turn, cause the restricting region 124 to partially or fully restrict to reduce or stop fluid flow through the fluid channel 110. Depressurization of the input gate terminal 126A may cause the gate transmission element 122 to be displaced away from the restricting region 124, resulting in a corresponding depressurization of the output gate terminal 126B. Depressurization of the output gate terminal 126B may, in turn, cause the restricting region 124 to partially or fully expand to allow or increase fluid flow through the fluid channel 110. Thus, the gate 120 of the fluidic valve 100 may be used to control fluid flow from the inlet port 112 to the outlet port 114 of the fluid channel 110.

Figure 2:
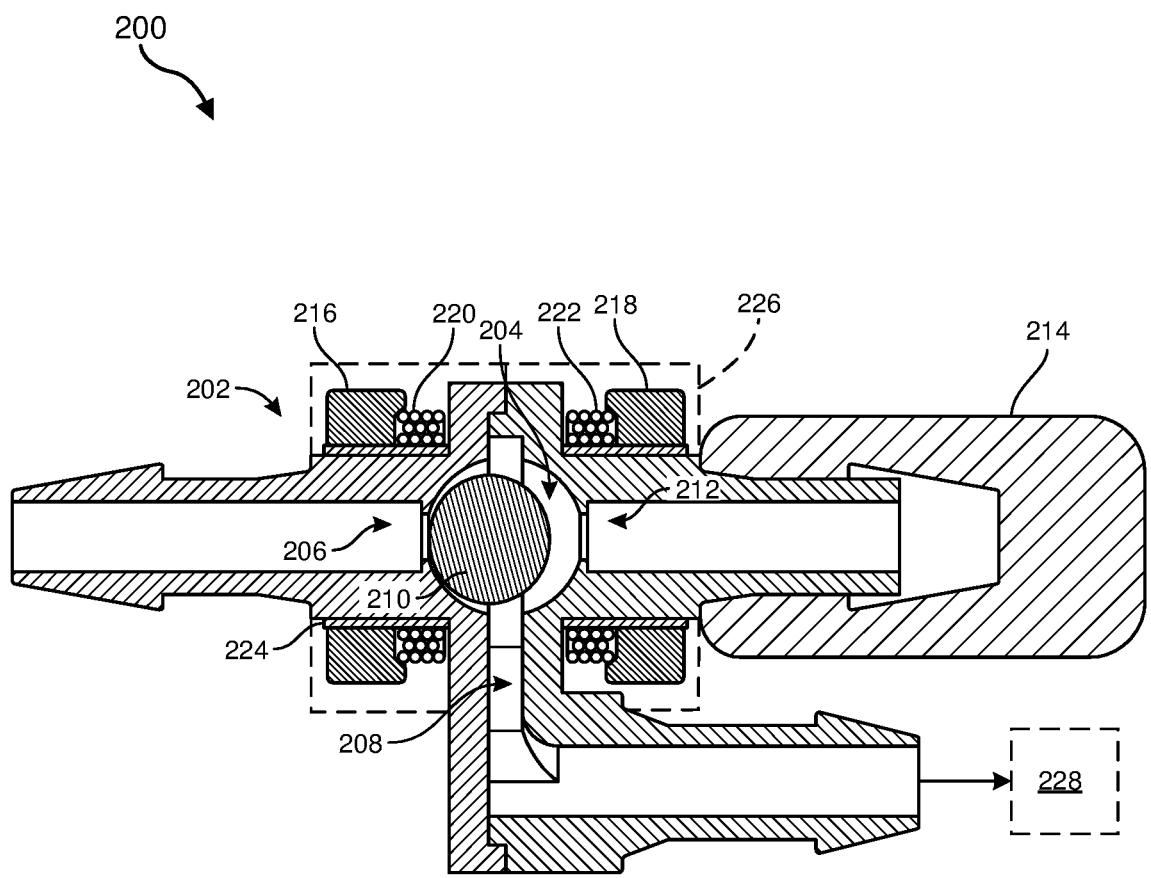
FIG. 2 is a cross-sectional view of a fluidic valve, according to at least one embodiment of the present disclosure.
Figure 3:
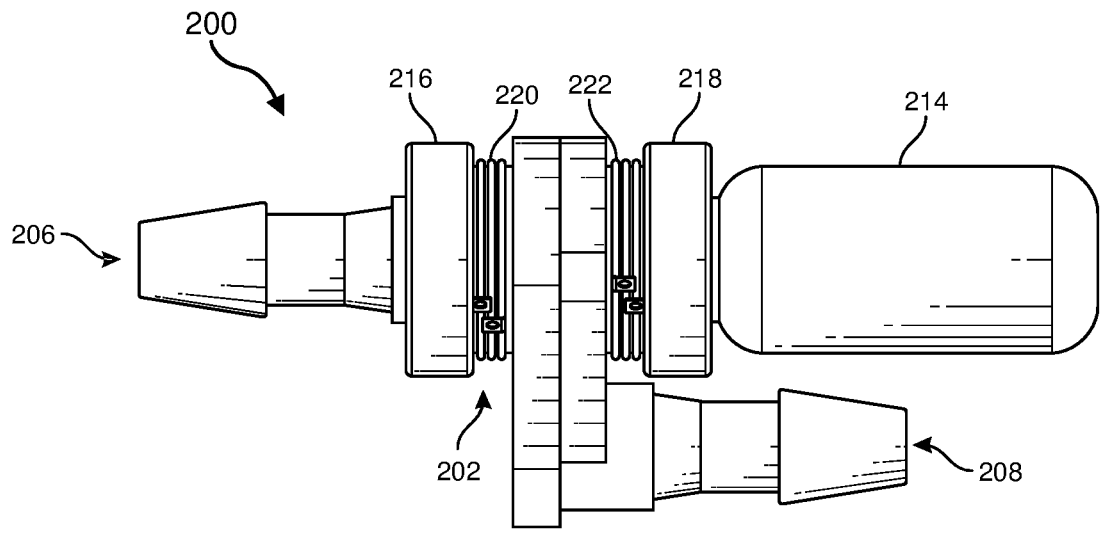
FIG. 3 is a side view of the fluidic valve of FIG. 2.
Figure 4:
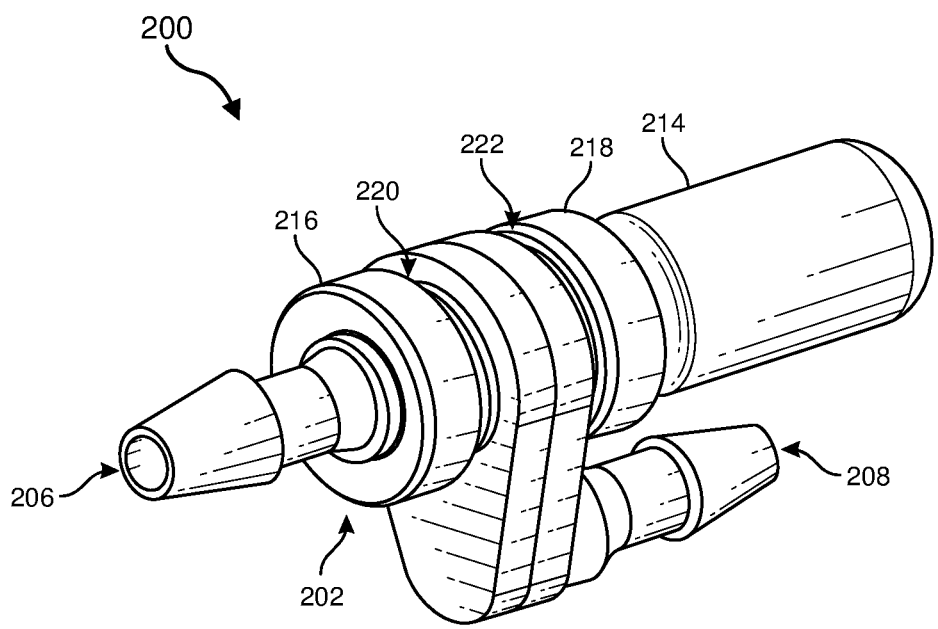
FIG. 4 is a perspective view of the fluidic valve of FIG. 2.
Figure 5:
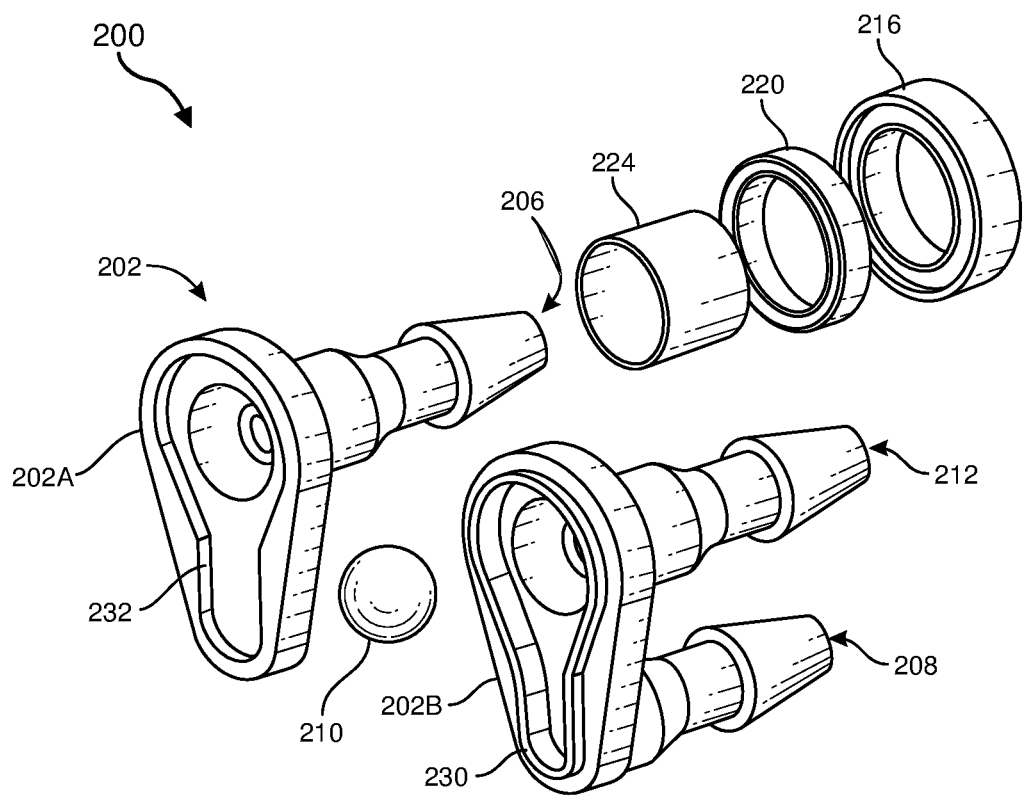
FIG. 5 is an exploded perspective view of a portion of the fluidic valve of FIG. 2.

FIG. 2 is a cross-sectional view of a fluidic valve 200 (e.g., a magnetic microfluidic valve), according to at least one embodiment of the present disclosure. FIG. 3 is a side view of the fluidic valve 200 of FIG. 2. FIG. 4 is a perspective view of the fluidic valve 200 of FIG. 2. FIG. 5 is an exploded perspective view of a portion of the fluidic valve 200 of FIG. 2.

Referring to FIGS. 2-5, the fluidic valve 200 may include a valve body 202 having at least one cavity 204 therein. An inlet port 206 (also referred to as an "input") and an outlet port 208 (also referred to as a "controlled output") may be in fluid communication with the cavity 204. A gate transmission element 210, which may be in the form of a ball, may be positioned within the cavity 204. The gate transmission element 210 may function like the gate transmission element 122 described above with reference to FIG. 1. However, the gate transmission element 210 may be or include a ferromagnetic material, which may be a material that responds to (i.e., experiences a magnetic force from) a magnetic field. In some embodiments, the ferromagnetic material may be a ferrous material or a permanent magnetic material. The gate transmission element 210 may be configured to move between a closed position (shown in FIG. 2) (e.g., blocking the inlet port 206 to inhibit the conveyance of a subject fluid from the inlet port 206 to the outlet port 208) and an open position (e.g., unblocking the inlet port 206 to allow for the conveyance of a subject fluid from the inlet port 206 to the outlet port 208), such as in response to a magnetic force from a magnetic field.

Although the gate transmission element 210 is illustrated herein in the form of a substantially spherical ball, the present disclosure is not so limited. In additional examples, the gate transmission element 210 may have another shape, such as cylindrical, rectangular prismatic, ovoid, frustoconical, etc. Additional example shapes that may be suitable for the gate transmission element 210 are illustrated in FIGS. 18A-18C and described below. In further embodiments, the gate transmission element 210 may be coupled to the valve body 202, such as in the form of a rotatable or flexible flap as illustrated in FIGS. 21A-21D.

In some examples, an exhaust port 212 may also be in fluid communication with the cavity 204. The exhaust port 212 may be configured to allow for the release of pressurized subject fluid from the outlet port 208 through the cavity 204 when the gate transmission element 210 is in the closed position. An exhaust boot 214 may, in some examples, cover at least a portion of the exhaust port 212.

The inlet port 206 and the outlet port 208 may each have an outer shape that is configured for coupling to a fluid conduit. For example, one or both of the inlet port 206 and the outlet port 208 may be configured to couple to a fluid conduit via a barbed fitting (as shown in FIG. 2), a threaded connection, a press fitting, etc.

As shown on the left side of FIG. 2, a permanent magnet 216 may be positioned and configured to bias the gate transmission element 210 to the closed position by magnetic force. In some embodiments, another permanent magnet 218 (shown on the right side of FIG. 2) may be positioned and configured to bias the gate transmission element 210 to the open position by magnetic force. The two permanent magnets 216, 218 may be positioned substantially equidistant from a center of the cavity 204, such that a magnetic force from the left (in the view of FIG. 2) permanent magnet 216 on the gate transmission element 210 may be greater than a magnetic force from the right (in the view of FIG. 2) permanent magnet 218 on the gate transmission element 210 when the gate transmission element 210 is located to the left of center, and vice versa. In addition, the magnetic force from the left permanent magnet 216 may be sufficiently strong to overcome a fluid pressure differential between the inlet port 206 and the outlet port 208, such that the gate transmission element 210 may block the conveyance of fluid from the inlet port 206 to the outlet port 208 in the closed position. In some examples, the fluid pressure differential may be up to about 30 pounds per square inch.

As shown in FIG. 2, an electromagnetic coil 220 may be positioned adjacent to the left permanent magnet 216. The electromagnetic coil 220 may be configured to, upon actuation, overcome a magnetic force acting on the gate transmission element 210 from the left permanent magnet 216, such as to allow the gate transmission element 210 to move away from the closed position to allow for the flow of subject fluid from the inlet port 206 to the outlet port 208. When the electromagnetic coil 220 is actuated (e.g., when a sufficient electrical current is applied to the electromagnetic coil 220), the fluid pressure within the inlet port 206 and/or a magnetic force from the right permanent magnet 218 may force the gate transmission element 210 into an open position.

In some embodiments, another electromagnetic coil 222 may be positioned adjacent to the right permanent magnet 218. The other electromagnetic coil 222 may be configured to, upon actuation, overcome a magnetic force acting on the gate transmission element 210 from the right permanent magnet 218, such as to allow the gate transmission element 210 to move away from the open position toward the closed position to inhibit the flow of subject fluid from the inlet port 206 to the outlet port 208. The permanent magnets 216, 218 and the electromagnetic coils 220, 222 may have a function similar to the gate terminals 126 of FIG. 1, in that the permanent magnets 216, 218 and the electromagnetic coils 220, 222 may be used to move the gate transmission element 210 between closed and open positions. In some embodiments, the fluidic valve 200 may lack a structure corresponding to the gate port 128 of FIG. 1, since the force for moving the gate transmission element 210 may be provided magnetically rather than fluidically in the fluidic valve 200 of FIG. 2. In addition, rather than deforming a fluid channel as in the fluidic valve 100 of FIG. 1, the gate transmission element 210 may be positioned within a flow path to directly block or unblock fluid flow through the fluidic valve 200 of FIG. 2.

Actuation of the electromagnetic coil(s) 220, 222 may include a pulse of electrical current, such as from one or more capacitors, sufficient to move the gate transmission element 210 across a center of the cavity 204. Thus, in some embodiments, the fluidic valve 200 may be a bi-stable system, with no electrical current required to maintain the gate transmission element 210 in either the closed position or the open position. Rather, electrical current may be applied (e.g., to the electromagnetic coil(s) 220, 222) only for switching between the closed position and the open position. In additional embodiments, actuation of the electromagnetic coil(s) 220, 222 may include a substantially continuous application of electrical current to the electromagnetic coil(s) 220, 222, such as to substantially continuously overcome the magnetic force from the permanent magnet(s) 216, 218 and/or a fluid force from within the inlet port 206.

As illustrated in FIGS. 2-5, the permanent magnet(s) 216, 218 and the electromagnetic coil(s) 220, 222 may be positioned to at least partially surround portions of the valve body 202 (e.g., the inlet port 206 and the exhaust port 212, respectively). In some embodiments, a sheath 224 configured to modify a magnetic flux may optionally be positioned over an outer surface of the valve body 202 and under the permanent magnet(s) 216, 218 and the electromagnetic coil(s) 220, 222. In additional embodiments, a covering 226 may optionally be positioned over the permanent magnet(s) 216, 218 and the electromagnetic coil(s) 220, 222.

FIGS. 2-5 illustrate embodiments of the fluidic valve 200 in which two permanent magnets 216, 218 and the electromagnetic coils 220, 222 are employed. However, the present disclosure is not so limited. In some examples, the permanent magnet 216 and the electromagnetic coil 220 may be present with the other permanent magnet 218 and the other electromagnetic coil 222 omitted. In this case, fluid pressure from the inlet 206 may move the gate transmission element 210 to an open position when magnetic force from the permanent magnet 216 is counteracted by the electromagnetic coil 220. When the fluidic valve 200 is to be closed, the permanent magnet 216 and/or the electromagnetic coil 220 may apply a sufficient magnetic force to the gate transmission element 210 to overcome the fluid pressure from the inlet 206 to move the gate transmission element 210 into a closed position.

In some embodiments, the fluidic valve 200 may be a microfluidic valve. For example, the fluidic valve 200 may fit within an area of about 1000 mm$^2$, about 500 mm$^2$, or about 125 mm$^2$. However, concepts from the present disclosure may also be applicable to larger fluidic valves.

The outlet port 208 may be in fluid communication with a fluid-driven mechanism 228 (FIG. 2) for selectively activating the fluid-driven mechanism 228 upon activation of the fluidic valve 200. For example, the fluid-driven mechanism 228 may be or include: a microelectromechanical device, an expansible cavity, a piston system, or a haptic feedback device.

As shown in FIG. 5, the valve body 202 may include a first body portion 202A and a second body portion 202B that are shaped and configured to be assembled to each other, with the gate transmission element 210 between the first and second body portions 202A, 202B. For example, a protrusion 230 on the second body portion 202B (or on the first body portion 202A) may be shaped and sized to be press fit into a corresponding depression 232 in the first body portion 202A (or in the second body portion 202B). An adhesive or other fastener (e.g., rivet, bolt, etc.) may be used to secure the first body portion 202A to the second body portion 202B.

Figure 6:
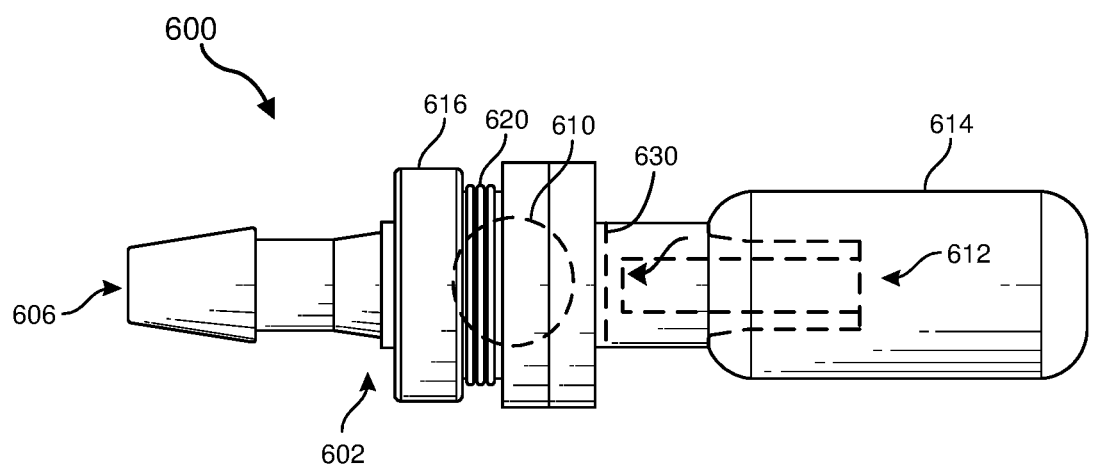
FIG. 6 is a side view of a fluidic valve, according to at least one additional embodiment of the present disclosure.

FIG. 6 is a side view of a fluidic valve 600 (e.g., a microfluidic valve) according to at least one additional embodiment of the present disclosure, with some internal components shown in dashed lines. The fluidic valve 600 may be similar to the fluidic valve 200 described above in some respects. For example, the fluidic valve 600 may include a valve body 602, an inlet port 606, a gate transmission element 610, an exhaust port 612, an exhaust boot 614, a permanent magnet 616, and an electromagnetic coil 620. The gate transmission element 610 may include a ferromagnetic material. The fluidic valve may also include a position restrictor 630, which may be located and configured to allow fluid to flow past the gate transmission element 610 and to the exhaust port 612 when the gate transmission element 610 is in an open position.

The fluidic valve 600 may be useful as a pressure release valve. For example, the permanent magnet 616 may hold the gate transmission element 610 in a closed position by magnetic force. When pressure is to be released through the inlet port 606, the electromagnetic coil 620 may be activated to counteract the magnetic force of the permanent magnet 616, which may allow the gate transmission element 610 to move from a closed position to an open position. Fluid pressure may then be released through the exhaust port 612. Additionally or alternatively, the fluidic valve 600 may have a pressure threshold at which the magnetic force from the permanent magnet 616 and/or from the electromagnetic coil 620 may be overcome. When the pressure threshold is reached, the fluid pressure may force the gate transmission element 610 to an open position. In addition, the pressure threshold may be adjustable, such as by applying different electric currents through the electromagnetic coil 620, which may effectively change a magnetic force applied to the gate transmission element 610.

Figure 7:
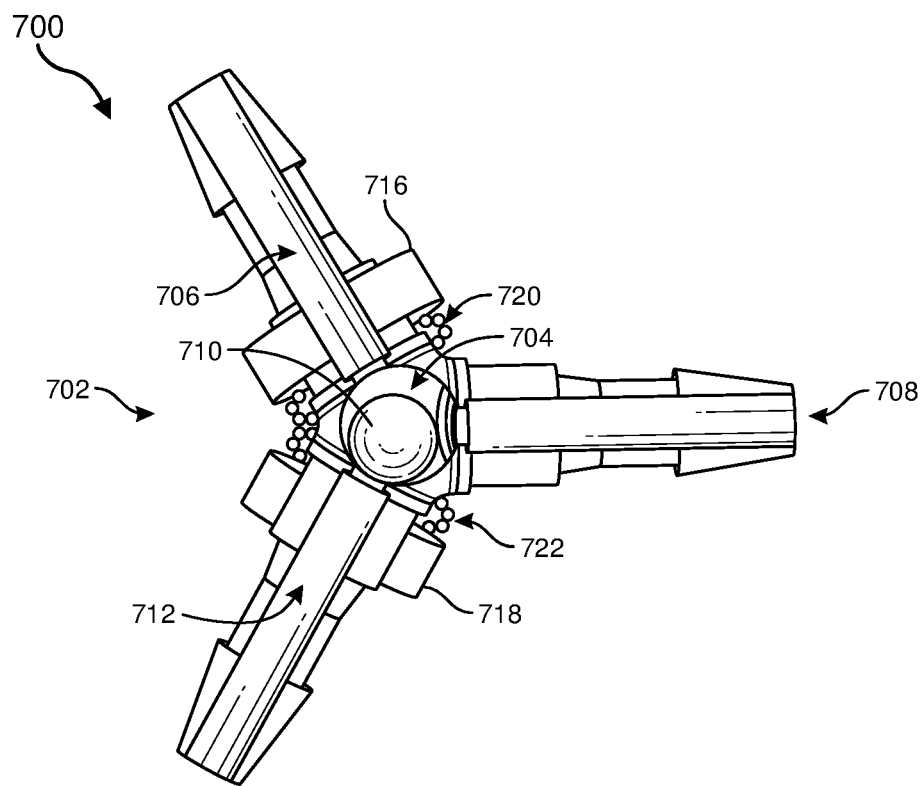
FIG. 7 is a cross-sectional view of a fluidic valve according to at least one additional embodiment of the present disclosure.
Figure 8:
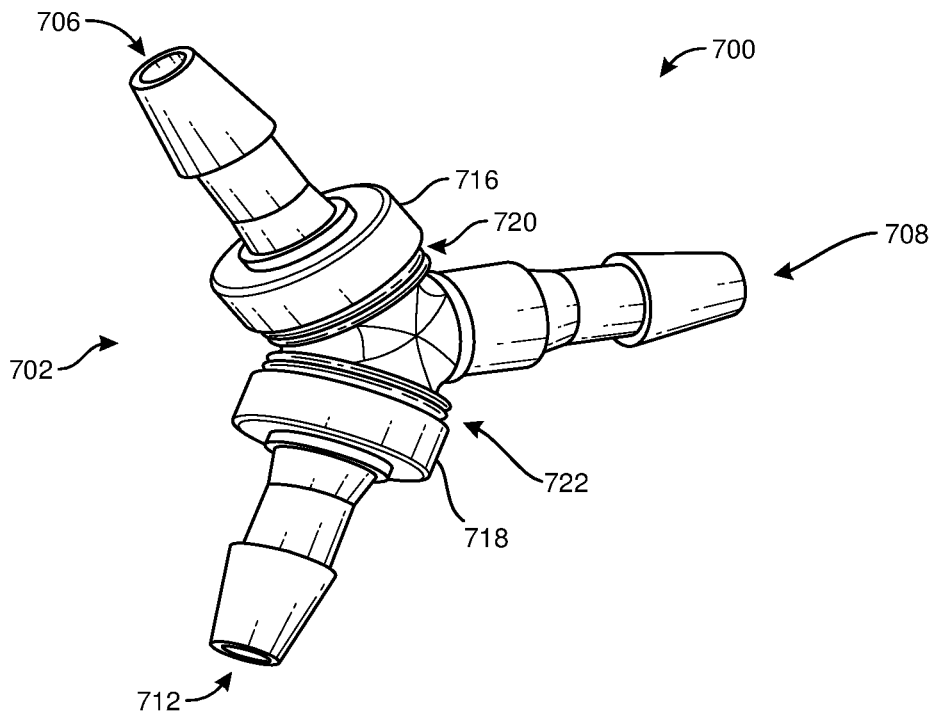
FIG. 8 is a perspective view of the fluidic valve of FIG. 7.

FIG. 7 is a cross-sectional view of a fluidic valve 700 (e.g., a microfluidic valve) according to at least one additional embodiment of the present disclosure. FIG. 8 is a perspective view of the fluidic valve 700 of FIG. 7. As shown in FIGS. 7 and 8, a valve body 702 of the fluidic valve 700 may have a substantially planar configuration, with an inlet port 706, outlet port 708, and exhaust port 712 arranged substantially equidistantly from each other (e.g., at about 120-degree angles from each other).

As in the example described above with reference to FIGS. 2-6, the fluidic valve 700 of FIGS. 7 and 8 may include a cavity 704 in the valve body 702, a gate transmission element 710 (e.g., a ferromagnetic ball) within the cavity 704, a first permanent magnet 716 for biasing the gate transmission element 710 to a closed position blocking the inlet port 706, and a second permanent magnet 718 for biasing the gate transmission element 710 to an open position unblocking the inlet port 706 and allowing the flow of subject fluid from the inlet port 706 to the outlet port 708. A first electromagnetic coil 720 may be positioned adjacent to the first permanent magnet 716 and may be configured to, when actuated, overcome the magnet force applied by the first permanent magnet 716 on the gate transmission element 710 to move the gate transmission element 710 to the open position (as shown in FIG. 7). A second electromagnetic coil 722 may be positioned adjacent to the second permanent magnet 718 and may be configured to, when actuated, overcome the magnet force applied by the second permanent magnet 718 on the gate transmission element 710 to move the gate transmission element 710 to the closed position.

Figure 9:
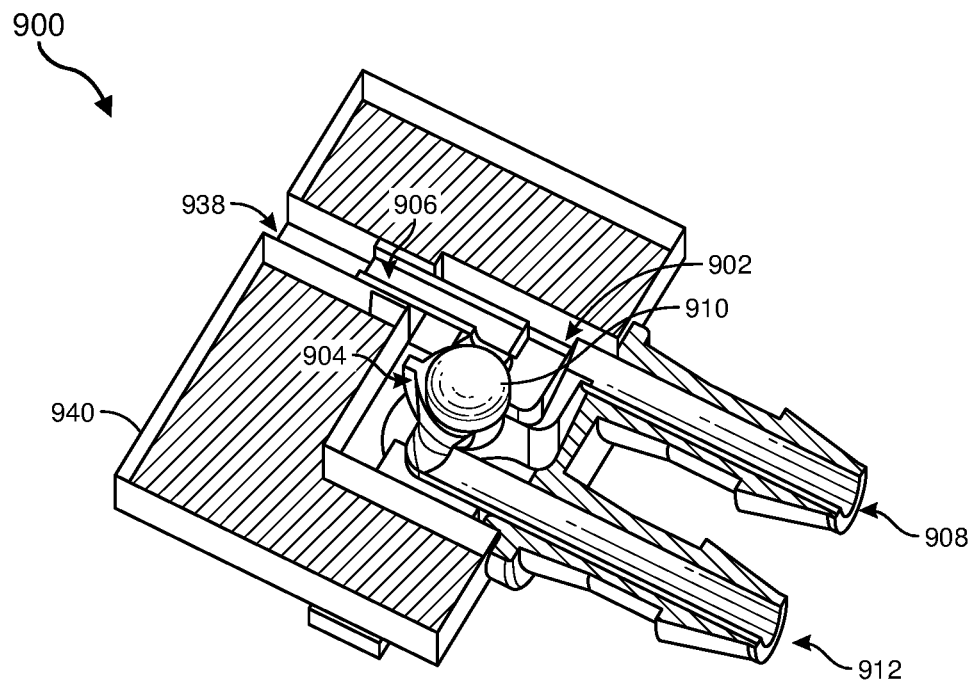
FIG. 9 is a cross-sectional perspective view of a fluidic valve according to at least one further embodiment of the present disclosure.
Figure 10:
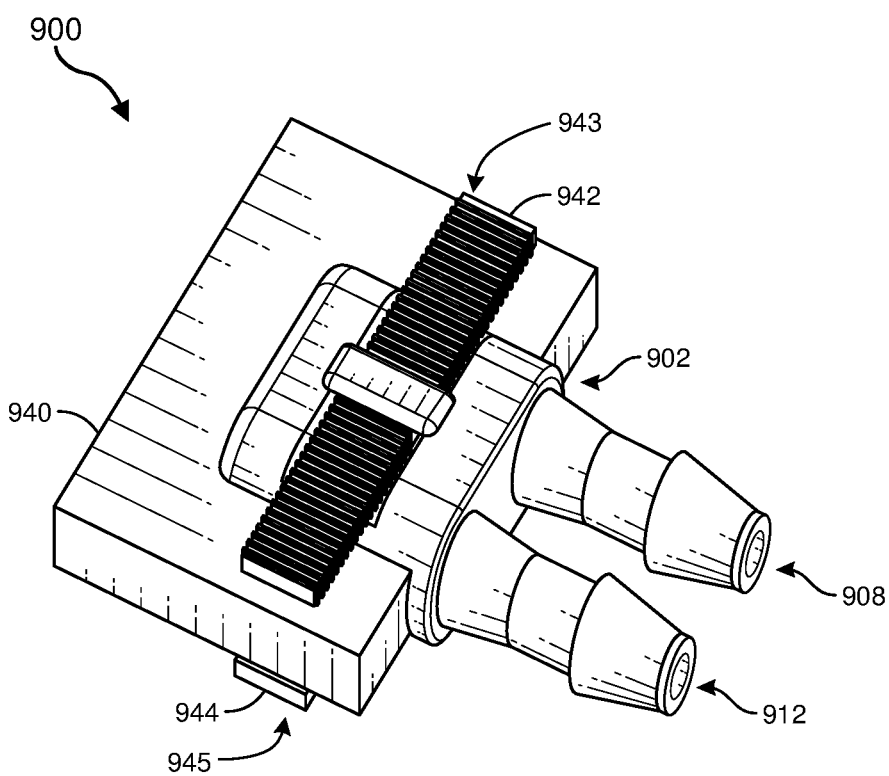
FIG. 10 is a perspective view of the fluidic valve of FIG. 9.
Figure 11:
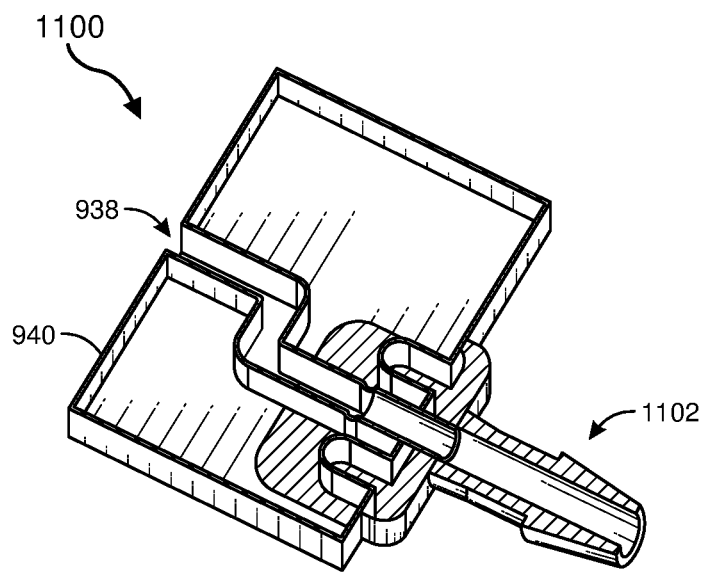
FIG. 11 is a cross-sectional perspective view of an inlet port that may be used in conjunction with the fluidic valve of FIG. 9.
Figure 12:
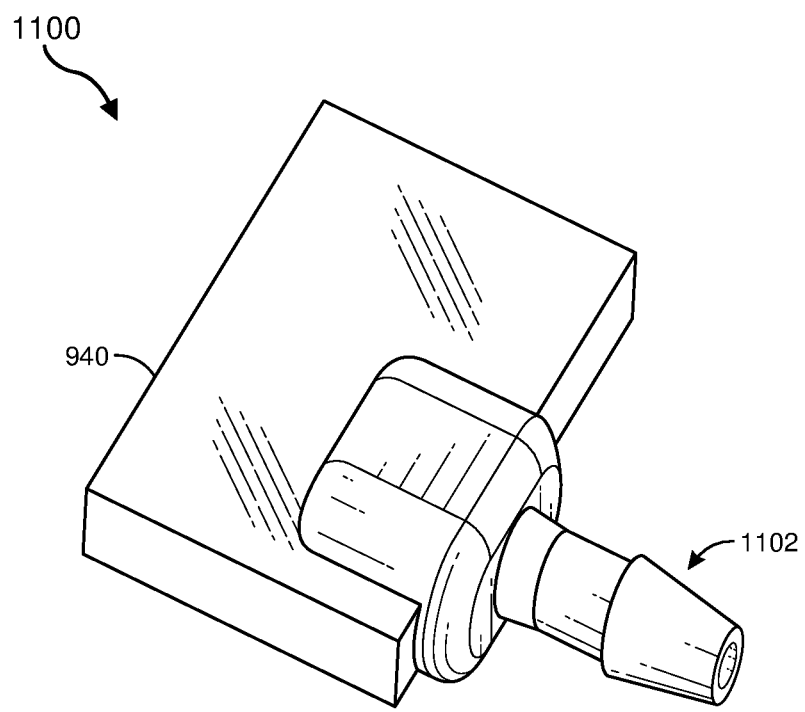
FIG. 12 is a perspective view of the inlet port of FIG. 11.

FIG. 9 is a cross-sectional perspective view of a fluidic valve 900 (e.g., a microfluidic valve) according to at least one further embodiment of the present disclosure. FIG. 10 is a perspective view of the fluidic valve 900 of FIG. 9. FIG. 11 is a cross-sectional perspective view of an inlet port 1100 that may be used in conjunction with the fluidic valve 900 of FIG. 9. FIG. 12 is a perspective view of the inlet port 1100 of FIG. 11.

As shown in FIGS. 9 and 10, the fluidic valve 900 may include a valve body 902 having a cavity 904 therein. An inlet port 906, outlet port 908, and exhaust port 912 may be in fluid communication with the cavity 904. A gate transmission element 910 (e.g., a ferromagnetic ball) may be positioned within the cavity 904 and may be movable between open and closed positions (the open position is shown in FIG. 9). The inlet port 906 may be in fluid communication with at least one fluid channel 938 in a substantially planar substrate 940, such as a printed circuit board ("PCB"), a semiconductor substrate, a ceramic substrate, a metallic substrate, or a polymeric substrate. The fluid channel(s) 938 in the substrate 940 may be part of, or may be operably coupled to, fluidic logic devices, for example.

As can be seen in FIG. 10, a surface-mounted permanent magnet 942 may be positioned over the valve body 902. Another surface-mounted permanent magnet 944 may be positioned under the valve body 902. The permanent magnets 942, 944 may be configured to respectively bias the gate transmission element 910 to the closed position or to the open position. Electromagnetic coils 943, 945 associated with the respective permanent magnets 942, 944 may be positioned, for example, on or in the valve body 902 and/or on or in the substrate 940.

Referring to FIGS. 11 and 12, an inlet connector 1100 may be in fluid communication with the fluid channel(s) 938 formed in the substrate 940. The inlet connector 1100 may include a conduit 1102 shaped and configured for connecting to an inlet fluid conduit, such as to operably couple a pressurized subject fluid source to the channel(s) 938 formed in the substrate 940.

Figure 13:
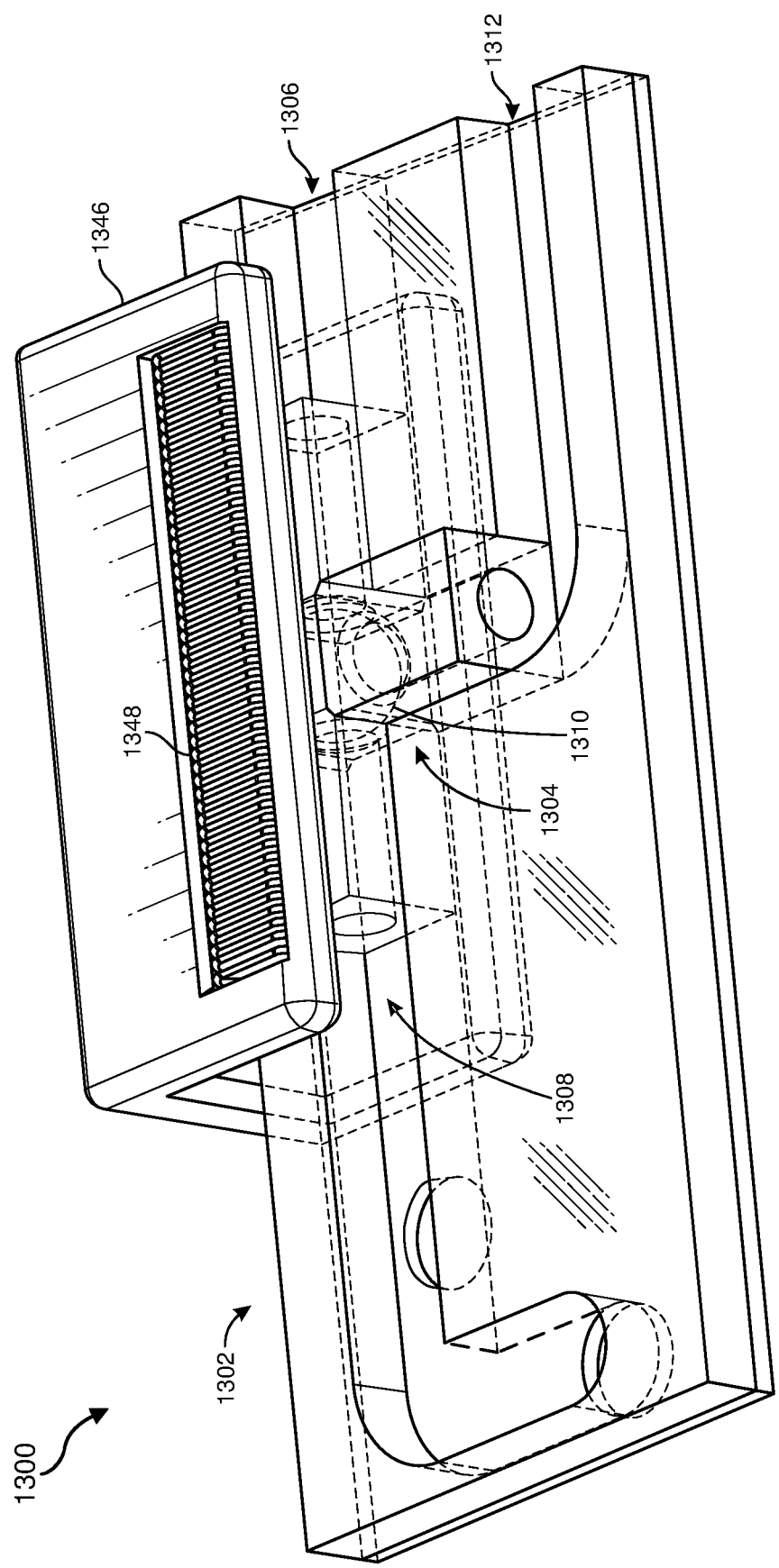
FIG. 13 is a partially cutaway perspective view of a fluidic valve according to at least one additional embodiment of the present disclosure.

FIG. 13 is a partially cutaway and transparent perspective view of a fluidic valve 1300 (e.g., a microfluidic valve) according to at least one additional embodiment of the present disclosure. As shown in FIG. 13, a valve body 1302 may have a substantially planar configuration. The valve body 1302 may include a cavity 1304. An inlet port 1306 (upper right of FIG. 13), outlet port 1308 (left of FIG. 13), and exhaust port 1312 (lower right of FIG. 13) may each be in fluid communication with the cavity 1304. A gate transmission element 1310 (e.g., a ferromagnetic ball) may be positioned within the cavity 1304 and movable between an open position and a closed position. An electronics-magnetics module 1346, which may be removable from the valve body 1302, may be positioned adjacent to (e.g., at least partially over) the cavity 1304. The electronics-magnetics module 1346 may include a permanent magnet 1348 configured to bias the gate transmission element 1310 to the closed position and a corresponding electromagnetic coil to overcome a magnetic force applied by the permanent magnet 1348. As discussed above, in some examples, another permanent magnet may be positioned (e.g., on a bottom portion of the electronics-magnetics module 1346, from the perspective of FIG. 13) and configured to bias the gate transmission element 1310 to the open position. Another corresponding electromagnetic coil may be positioned to overcome a magnetic force applied by the other permanent magnet.

Figure 14:
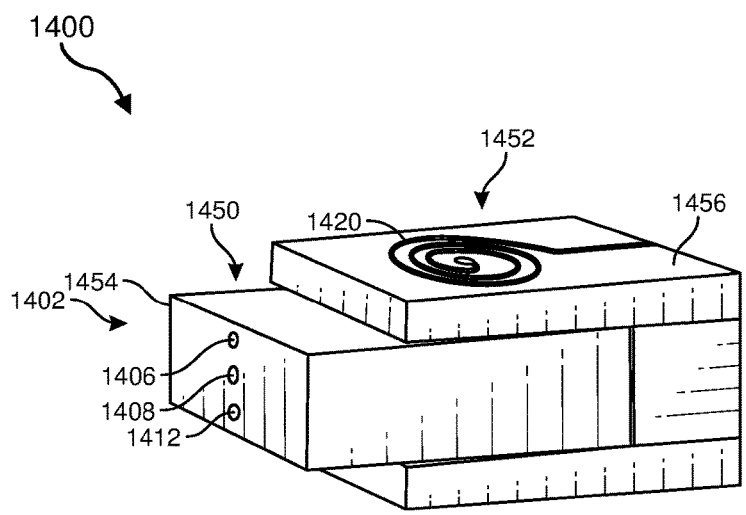
FIG. 14 is a perspective view of a fluidic valve according to at least one further embodiment of the present disclosure.
Figure 15:
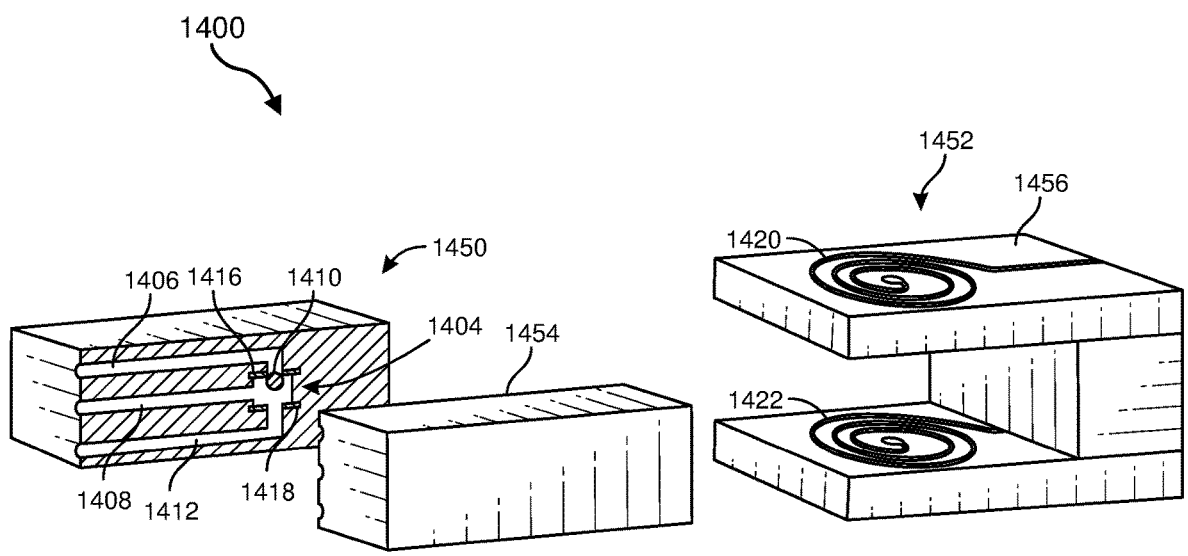
FIG. 15 is an exploded perspective view of the fluidic valve of FIG. 14.

FIG. 14 is a perspective view of a fluidic valve 1400 (e.g., a microfluidic valve) according to at least one further embodiment of the present disclosure. FIG. 15 is an exploded and partially cross-sectional perspective view of the fluidic valve 1400 of FIG. 14.

The fluidic valve 1400 may include a fluid module 1450 (identified in FIG. 14 as "pneumatic module") and an electronics module 1452. The fluid module 1450 may form a valve body 1402 that includes a cavity 1404, an inlet port 1406, outlet port 1408, and exhaust port 1412. A gate transmission element 1410 (e.g., a ferromagnetic ball) may be positioned within the cavity 1404 and movable between a closed position (shown in FIG. 15) and an open position. Permanent magnets 1416, 1418 may be respectively positioned and configured to bias the gate transmission element 1410 to the closed position and to the open position. The electronics module 1452 may include electromagnetic coils 1420, 1422 that are configured to, upon actuation, counter the magnetic force(s) on the gate transmission element 1410 from the permanent magnet(s) 1416, 1418.

In some embodiments, the electronics module 1452 may be removable from the fluid module 1450. In this case, the permanent magnets 1416, 1418 may maintain the gate transmission element 1410 in a closed position or an open position even after the electronics module 1452 is removed from the fluid module 1450. To change the position of the gate transmission element 1410 between the closed and open positions, the electronics module 1452 may be e.g., disposed over the fluid module 1450 in the position shown in FIG. 14 and actuated to overcome the magnetic force(s) on the gate transmission element 1410. After the electronics module 1452 is removed and/or deactivated, the gate transmission element 1410 may remain in its closed or open position.

In some examples, the electronics module 1452 and/or the fluid module 1450 may include one or more substrates 1454, 1456, such as PCBs, polymer substrates (e.g., silicone substrates), semiconductor substrates, metallic substrates, or glass substrates, for example. The electromagnetic coils 1420, 1422 may be located on or in the substrate(s) 1456. In some embodiments, the electromagnetic coils 1420, 1422 may be or include so-called "flexible circuit" elements.

Figure 16:
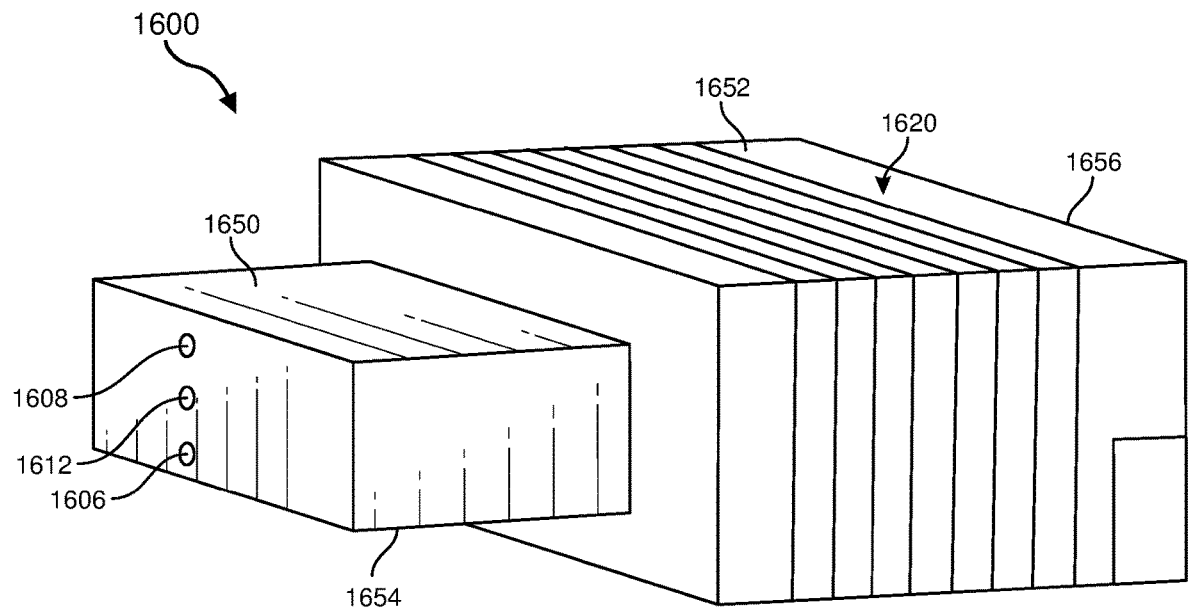
FIG. 16 is a perspective view of a fluidic valve according to at least one other embodiment of the present disclosure.

FIG. 16 is a perspective view of a fluidic valve 1600 (e.g., a microfluidic valve) according to at least one other embodiment of the present disclosure. FIG. 17 is an exploded perspective view of a fluid module 1650 of the fluidic valve 1600 of FIG. 16.

As shown in FIG. 16, the fluidic valve 1600 may include the fluid module 1650, which may form a valve body 1602 of the fluidic valve 1600. The valve body 1602 may include a cavity 1604 (FIG. 17), which may house a gate transmission element 1610 (e.g., a ferromagnetic valve), an inlet port 1606, an outlet port 1608, and an exhaust port 1612. Permanent magnets may be respectively positioned and configured to bias the gate transmission element to the closed position and to the open position, as discussed above. The fluidic valve 1600 may also include an electronics module 1652, which may include at least one electromagnetic coil 1620 that is configured to, upon actuation, counter the magnetic force(s) on the gate transmission element 1610 from the permanent magnet(s). For example, the electromagnetic coil 1620 may at least partially surround an edge of the fluid module 1650.

In some examples, the electronics module 1652 and/or the fluid module 1650 may include one or more substrates 1654, 1656, such as PCBs, polymer substrates (e.g., silicone substrates), semiconductor substrates, metallic substrates, or glass substrates, for example. The electromagnetic coils 1620 may be located on or in the substrate 1656. In some embodiments, the electromagnetic coils 1620 may be or include so-called "flexible circuit" elements.

FIGS. 18A-18C illustrate various example gate transmission elements 1800A, 1800B, 1800C (collectively referred to as "gate transmission elements 1800") that may be employed as any of the gate transmission elements described above. The gate transmission element 1800A shown in FIG. 18A may have an ovoid shape. The gate transmission element 1800B shown in FIG. 18B may have a guided ball shape, with a central spherical region 1802 and two guide posts 1804 extending away from the central spherical region 1802 in opposite directions. The two guide posts 1804 may be configured to fit inside an inlet port, an outlet port, and/or an exhaust port. The gate transmission element 1800C shown in FIG. 18C may have a central cylindrical portion 1806 and two opposing end portions 1808 that each have a conical shape. Accordingly, gate transmission elements according to the present disclosure may have a variety of shapes.

FIG. 19A illustrates a fluidic valve 1900A according to at least one additional embodiment of the present application. The fluidic valve 1900A may include a flexible conduit 1902, which may include a fluid inlet 1906 and a fluid outlet 1908. A permanent magnet 1916 and an electromagnetic coil 1920 may be positioned adjacent to the flexible conduit 1902 between the fluid inlet 1906 and the fluid outlet 1908. A gate transmission element 1910A, which may include a ferromagnetic material, may be positioned on an opposite side of the flexible conduit 1902 from the permanent magnet 1916.

A restriction region 1960 of the flexible conduit 1902 may be positioned between the gate transmission element 1910A and the permanent magnet 1916. When a magnetic force is applied by the permanent magnet 1916 and/or the electromagnetic coil 1920 against the gate transmission element 1910A, the gate transmission element 1910A may be moved into a closed position, as shown in FIG. 19A, in which the restriction region 1960 is compressed and restricted. When an electric current is applied to the electromagnetic coil 1920 to counteract the magnetic force applied by the permanent magnet 1916, the gate transmission element 1910A may move into an open position in which the restriction region 1960 is released and opened (relative to the closed position).

As shown in FIG. 19A in dashed lines, in some embodiments an additional permanent magnet 1918 and an additional electromagnetic coil 1922 may be positioned on a same side of the flexible conduit 1902 as the gate transmission element 1910A. When a magnetic force is applied by the additional permanent magnet 1918 and/or the additional electromagnetic coil 1922 to the gate transmission element 1910A, the gate transmission element 1910A may be moved into the open position. When an electric current is applied to the additional electromagnetic coil 1922 to counteract the magnetic force applied by the additional permanent magnet 1918, the gate transmission element 1910A may be able to move into the closed position in response to magnetic force applied by the permanent magnet 1916 and/or the electromagnetic coil 1920.

FIG. 19B illustrates a fluidic valve 1900B according to at least one further embodiment of the present application. The fluidic valve 1900B may in some respects be similar to the fluidic valve 1900A shown in FIG. 19A. For example, the fluidic valve 1900B may include a flexible conduit 1902, which may include a fluid inlet 1906 and a fluid outlet 1908. A permanent magnet 1916 and an electromagnetic coil 1920 may be positioned adjacent to the flexible conduit 1902 between the fluid inlet 1906 and the fluid outlet 1908. A gate transmission element 1910B, which may include a ferromagnetic material, may be positioned on an opposite side of the flexible conduit 1902 from the permanent magnet 1916. A restriction region 1960 of the flexible conduit 1902 may be positioned between the gate transmission element 1910B and the permanent magnet 1916. The fluidic valve 1900B may function in a similar way to the fluidic valve 1900A shown in FIG. 19A. Like the fluidic valve 1900A of FIG. 19A, the fluidic valve 1900B of FIG. 19B may optionally employ an additional permanent magnet and an additional electromagnetic coil to move the gate transmission element 1910B.

As illustrated in FIG. 19B, the gate transmission element 1910B may have a wedge shape. For some applications, such a wedge shape may exhibit different operating characteristics than a gate transmission element having another shape, such as a ball shape. For example, the apex of the wedge-shaped gate transmission element 1910B may, in some applications, reduce a force required to close the restriction region 1960.

FIG. 20 is a flow diagram illustrating a method 2000 of controlling fluid flow according to at least one embodiment of the present disclosure. At operation 2010, a subject fluid may be conveyed through a cavity of a fluidic valve from an inlet port to an outlet port. At operation 2020, a magnetic force may be applied to a ferromagnetic gate transmission element (e.g., a ferromagnetic ball) positioned within the cavity with a permanent magnet to move the gate transmission element from an open position unblocking the inlet port to a closed position blocking the inlet port to inhibit the conveyance of the subject fluid through the cavity from the inlet port to the outlet port. At operation 2030, an electromagnetic coil may be actuated to sufficiently overcome the magnetic force applied by the permanent magnet to move the gate transmission element from the closed position to the open position to resume conveyance of the subject fluid through the cavity from the inlet port to the outlet port.

In some examples, the method 2000 may also include applying another magnetic force to the gate transmission element with another permanent magnet to maintain the gate transmission element in the open position. In addition, another electromagnetic coil may be actuated to sufficiently overcome the other magnetic force applied by the other permanent magnet to move the gate transmission element from the open position to the closed position to again inhibit conveyance of the subject fluid through the cavity from the inlet port to the outlet port. In some examples a fluid-driven mechanism that is in fluid communication with the outlet port may be activated with the subject fluid.

FIGS. 21A-21D illustrate various views of a fluidic valve 2100 and components thereof. In particular, FIG. 21A shows a side view of the fluidic valve 2100. FIG. 21B shows a top view of a gate transmission element 2110 of the fluidic valve 2100. FIG. 21C shows a view taken from line A-A in FIG. 21A of the fluidic valve 2100 in an open position and FIG. 21D shows a view taken from line A-A in FIG. 21A of the fluidic valve 2100 in a closed position.

The fluidic valve 2100 may include a conduit 2102, which may include a fluid inlet 2106 and a fluid outlet 2108. A first permanent magnet 2116 and a first electromagnetic coil 2120 may be positioned adjacent to one side of the conduit 2106 between the fluid inlet 2106 and the fluid outlet 2108. A second permanent magnet 2118 and a second electromagnetic coil 2122 may be positioned adjacent to an opposite side of the conduit 2106 between the fluid inlet 2106 and the fluid outlet 2108. The gate transmission element 2110, which may include a ferromagnetic material, may be flexibly positioned and/or rotatably positioned within the conduit 2102. At least a portion of the gate transmission element 2110 may be positioned between the first permanent magnet 2116 and the second permanent magnet 2118. A restriction region 2160 may exist within the conduit 2102 at the location of the gate transmission element 2110.

As illustrated in FIGS. 21A and 21B, the gate transmission element 2110 may be a generally planar element that may be rotatable within the conduit 2102 about a pivot 2162 between an open position (shown in FIG. 21C and show in dashed lines in FIG. 21A) and a closed position (shown in FIG. 21D and shown in solid lines in FIG. 21A). The gate transmission element 2110 may have a shape corresponding to an inner shape of the conduit 2102. For example, as illustrated in FIG. 21B, if the conduit 2102 has a circular inner shape, the gate transmission element 2110 may have an elliptical shape to fit within the conduit 2102 at an angled orientation when in the closed position. In other embodiments, the inner shape of the conduit 2102 and the corresponding shape of the gate transmission element 2110 may be different than is illustrated in FIGS. 21A-21D. For example, if the conduit 2102 has a square or rectangular inner shape, the gate transmission element 2110 may have a rectangular shape. Similarly, if the conduit 2102 has a triangular inner shape, the gate transmission element 2110 may have an elongated triangular shape. In some embodiments, the conduit 2102 may be flexible to conform to an outer perimeter of the gate transmission element 2110 as the gate transmission element 2110 moves between the closed and open positions. In some embodiments, the gate transmission element 2110 may be flexible to conform to an inner contour of the conduit 2102 as the gate transmission element 2110 moves between the closed and open positions.

When a magnetic force is applied by the first permanent magnet 2116 and/or the first electromagnetic coil 2120 against the gate transmission element 2110, the gate transmission element 2110 may be moved into an open position, as shown in FIG. 21C and in dashed lines in FIG. 21A. When an electric current is applied to the first electromagnetic coil 2120 to counteract the magnetic force applied by the first permanent magnet 2116, the gate transmission element 2110 may rotate and move into the closed position (shown in FIG. 21D and in solid lines in FIG. 21A) in response to magnetic force applied by the second permanent magnet 2118 and/or by the second electromagnetic coil 2122. Similarly, when an electric current is applied the second electromagnetic coil 2122 to counteract the magnetic force applied by the second permanent magnet, 2118, the gate transmission element 2110 may rotate and move into the open position (shown in FIG. 21C and in dashed lines in FIG. 21A) in response to magnetic force applied by the first permanent magnet 2116 and/or by the first electromagnetic coil 2120.

Accordingly, the present disclosure includes magnetic fluidic valves (e.g., magnetic microfluidic valves) and methods of controlling fluid flow that may include a ferromagnetic gate transmission element that can be moved between a closed position and an open position with magnetic forces. Any of the magnetic fluidic valves of the present disclosure may be used in combination (e.g., in series and/or in parallel) with each other, such as to provide various levels of flow volume (e.g., increased flow volume) to a fluidic system.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 2200 in FIG. 22. Other artificial reality systems may include an NED that also provides visibility into the real world (e.g., augmented-reality system 2300 in FIG. 23) or that visually immerses a user in an artificial reality (e.g., virtual-reality system 2400 in FIG. 24). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 22:
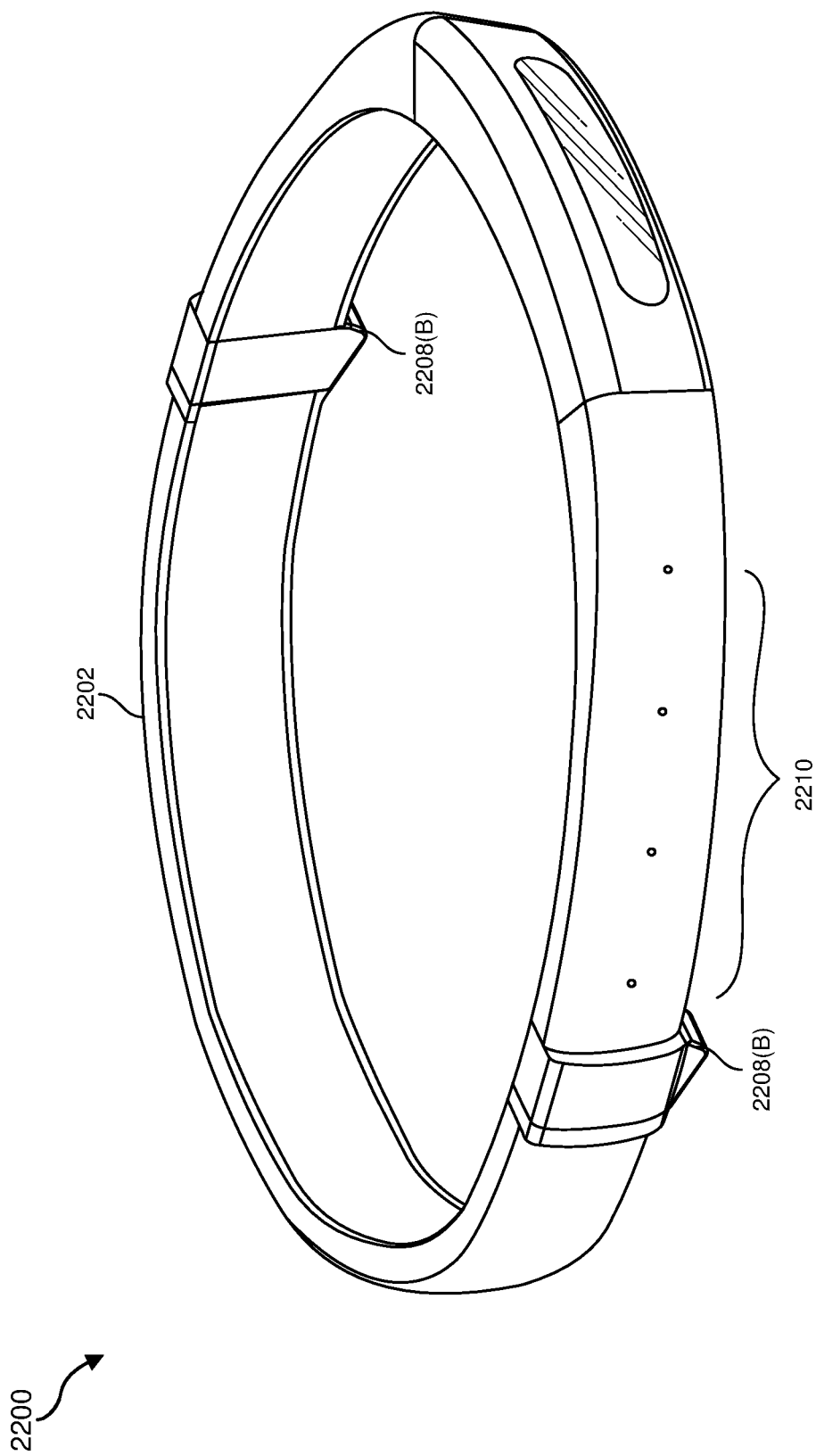
FIG. 22 is an illustration of an example artificial-reality headband that may be used in connection with embodiments of this disclosure.

Turning to FIG. 22, the augmented-reality system 2200 generally represents a wearable device dimensioned to fit about a body part (e.g., a head) of a user. As shown in FIG. 22, the system 2200 may include a frame 2202 and a camera assembly 2204 that is coupled to the frame 2202 and configured to gather information about a local environment by observing the local environment. The augmented-reality system 2200 may also include one or more audio devices, such as output audio transducers 2208(A) and 2208(B) and input audio transducers 2210. The output audio transducers 2208(A) and 2208(B) may provide audio feedback and/or content to a user, and the input audio transducers 2210 may capture audio in a user's environment.

As shown, the augmented-reality system 2200 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the augmented-reality system 2200 may not include an NED, the augmented-reality system 2200 may include other types of screens or visual feedback devices (e.g., a display screen integrated into a side of the frame 2202).

Figure 23:
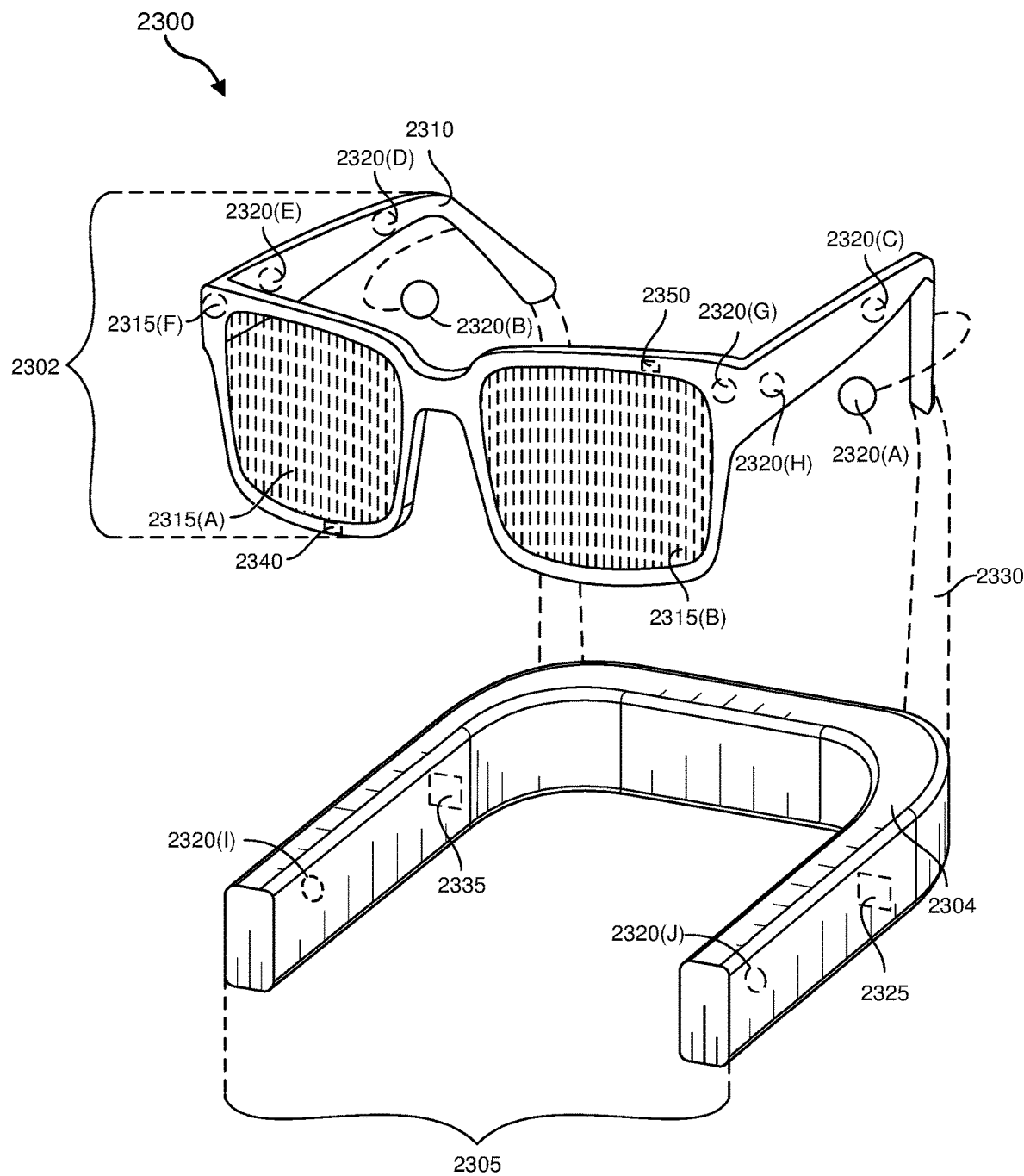
FIG. 23 is an illustration of example augmented-reality glasses that may be used in connection with embodiments of this disclosure.

The embodiments discussed in this disclosure may also be implemented in augmented-reality systems that include one or more NEDs. For example, as shown in FIG. 23, the augmented-reality system 2300 may include an eyewear device 2302 with a frame 2310 configured to hold a left display device 2315(A) and a right display device 2315(B) in front of a user's eyes. The display devices 2315(A) and 2315(B) may act together or independently to present an image or series of images to a user. While the augmented-reality system 2300 includes two displays, embodiments of this disclosure may be implemented in augmented-reality systems with a single NED or more than two NEDs.

In some embodiments, the augmented-reality system 2300 may include one or more sensors, such as sensor 2340. The sensor 2340 may generate measurement signals in response to motion of the augmented-reality system 2300 and may be located on substantially any portion of frame 2310. The sensor 2340 may represent a position sensor, an inertial measurement unit (IMU), a depth camera assembly, or any combination thereof. In some embodiments, the augmented-reality system 2300 may or may not include sensor the 2340 or may include more than one sensor. In embodiments in which the sensor 2340 includes an IMU, the IMU may generate calibration data based on measurement signals from the sensor 2340. Examples of the sensor 2340 may include, without limitation, accelerometers, gyroscopes, magnetometers, other suitable types of sensors that detect motion, sensors used for error correction of the IMU, or some combination thereof.

The augmented-reality system 2300 may also include a microphone array with a plurality of acoustic transducers 2320(A)-2320(J), referred to collectively as the acoustic transducers 2320. The acoustic transducers 2320 may be transducers that detect air pressure variations induced by sound waves. Each of the acoustic transducers 2320 may be configured to detect sound and convert the detected sound into an electronic format (e.g., an analog or digital format). The microphone array in FIG. 20 may include, for example, ten acoustic transducers: 2320(A) and 2320(B), which may be designed to be placed inside a corresponding ear of the user, acoustic transducers 2320(C), 2320(D), 2320(E), 2320

(F), 2320(G), and 2320(H), which may be positioned at various locations on frame 2310, and/or acoustic transducers 2320(I) and 2320(J), which may be positioned on a corresponding neckband 2305.

In some embodiments, one or more of the acoustic transducers 2320(A)-(F) may be used as output transducers (e.g., speakers). For example, the acoustic transducers 2320 (A) and/or 2320(B) may be earbuds or any other suitable type of headphone or speaker.

The configuration of the acoustic transducers 2320 of the microphone array may vary. While the augmented-reality system 2300 is shown in FIG. 23 as having ten acoustic transducers 2320, the number of the acoustic transducers 2320 may be greater or less than ten. In some embodiments, using higher numbers of the acoustic transducers 2320 may increase the amount of audio information collected and/or the sensitivity and accuracy of the audio information. In contrast, using a lower number of the acoustic transducers 2320 may decrease the computing power required by the controller 2350 to process the collected audio information. In addition, the position of each acoustic transducer 2320 of the microphone array may vary. For example, the position of an acoustic transducer 2320 may include a defined position on the user, a defined coordinate on the frame 2310, an orientation associated with each acoustic transducer, or some combination thereof.

The acoustic transducers 2320(A) and 2320(B) may be positioned on different parts of the user's ear, such as behind the pinna or within the auricle or fossa. Or, there may be additional acoustic transducers on or surrounding the ear in addition to the acoustic transducers 2320 inside the ear canal. Having an acoustic transducer 2020 positioned next to an ear canal of a user may enable the microphone array to collect information on how sounds arrive at the ear canal. By positioning at least two of the acoustic transducers 2320 on either side of a user's head (e.g., as binaural microphones), the augmented-reality system 2300 may simulate binaural hearing and capture a 3D stereo sound field around about a user's head. In some embodiments, the acoustic transducers 2320(A) and 2320(B) may be connected to the augmented-reality system 2300 via a wired connection 2330, and in other embodiments, the acoustic transducers 2320(A) and 2320(B) may be connected to the augmented-reality system 2300 via a wireless connection (e.g., a Bluetooth connection). In still other embodiments, the acoustic transducers 2320(A) and 2320(B) may not be used at all in conjunction with the augmented-reality system 2300.

Acoustic transducers 2320 on frame 2310 may be positioned along the length of the temples, across the bridge, above or below display devices 2315(A) and 2315(B), or some combination thereof. Acoustic transducers 2320 may be oriented such that the microphone array is able to detect sounds in a wide range of directions surrounding the user wearing the augmented-reality system 2300. In some embodiments, an optimization process may be performed during manufacturing of the augmented-reality system 2300 to determine relative positioning of each acoustic transducer 2320 in the microphone array.

In some examples, the augmented-reality system 2300 may include or be connected to an external device (e.g., a paired device), such as neckband 2305. The neckband 2305 generally represents any type or form of paired device. Thus, the following discussion of the neckband 2305 may also apply to various other paired devices, such as charging cases, smart watches, smart phones, wrist bands, other wearable devices, hand-held controllers, tablet computers, laptop computers, and other external computer devices, etc.

As shown, the neckband 2305 may be coupled to the eyewear device 2302 via one or more connectors. The connectors may be wired or wireless and may include electrical and/or non-electrical (e.g., structural) components. In some cases, the eyewear device 2302 and the neckband 2305 may operate independently without any wired or wireless connection between them. While FIG. 23 illustrates the components of the eyewear device 2302 and the neckband 2305 in example locations on the eyewear device 2302 and the neckband 2305, the components may be located elsewhere and/or distributed differently on the eyewear device 2302 and/or the neckband 2305. In some embodiments, the components of the eyewear device 2302 and the neckband 2305 may be located on one or more additional peripheral devices paired with the eyewear device 2302, the neckband 2305, or some combination thereof.

Pairing external devices, such as the neckband 2305, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 2300 may be provided by a paired device or shared between a paired device and an eyewear device, thus reducing the weight, heat profile, and form factor of the eyewear device overall while still retaining desired functionality. For example, the neckband 2305 may allow components that would otherwise be included on an eyewear device to be included in the neckband 2305 since users may tolerate a heavier weight load on their shoulders than they would tolerate on their heads. The neckband 2305 may also have a larger surface area over which to diffuse and disperse heat to the ambient environment. Thus, the neckband 2305 may allow for greater battery and computation capacity than might otherwise have been possible on a stand-alone eyewear device. Since weight carried in the neckband 2305 may be less invasive to a user than weight carried in the eyewear device 2302, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

The neckband 2305 may be communicatively coupled with the eyewear device 2302 and/or to other devices. These other devices may provide certain functions (e.g., tracking, localizing, depth mapping, processing, storage, etc.) to the augmented-reality system 2300. In the embodiment of FIG. 23, the neckband 2305 may include two acoustic transducers (e.g., 2320(I) and 2320(J)) that are part of the microphone array (or potentially form their own microphone subarray). The neckband 2305 may also include a controller 2325 and a power source 2335.

The acoustic transducers 2320(I) and 2320(J) of the neckband 2305 may be configured to detect sound and convert the detected sound into an electronic format (analog or digital). In the embodiment of FIG. 23, the acoustic transducers 2320(I) and 2320(J) may be positioned on the neckband 2305, thereby increasing the distance between the neckband acoustic transducers 2320(I) and 2320(J) and other acoustic transducers 2320 positioned on the eyewear device 2302. In some cases, increasing the distance between the acoustic transducers 2320 of the microphone array may improve the accuracy of beamforming performed via the microphone array. For example, if a sound is detected by the acoustic transducers 2320(C) and 2320(D) and the distance between the acoustic transducers 2320(C) and 2320(D) is greater than, e.g., the distance between the acoustic transducers 2320(D) and 2320(E), the determined source location of the detected sound may be more accurate than if the sound had been detected by the acoustic transducers 2320(D) and 2320(E).

The controller 2325 of the neckband 2305 may process information generated by the sensors on the neckband 2305 and/or the augmented-reality system 2300. For example, the controller 2325 may process information from the microphone array that describes sounds detected by the microphone array. For each detected sound, the controller 2325 may perform a direction-of-arrival (DOA) estimation to estimate a direction from which the detected sound arrived at the microphone array. As the microphone array detects sounds, the controller 2325 may populate an audio data set with the information. In embodiments in which augmented-reality system 2300 includes an inertial measurement unit, the controller 2325 may compute all inertial and spatial calculations from the IMU located on the eyewear device 2302. A connector may convey information between the augmented-reality system 2300 and the neckband 2305 and between the augmented-reality system 2300 and the controller 2325. The information may be in the form of optical data, electrical data, wireless data, or any other transmittable data form. Moving the processing of information generated by the augmented-reality system 2300 to the neckband 2305 may reduce weight and heat in the eyewear device 2302, making it more comfortable to the user.

The power source 2335 in the neckband 2305 may provide power to the eyewear device 2302 and/or to the neckband 2305. The power source 2335 may include, without limitation, lithium ion batteries, lithium-polymer batteries, primary lithium batteries, alkaline batteries, or any other form of power storage. In some cases, the power source 2335 may be a wired power source. Including the power source 2335 on the neckband 2305 instead of on the eyewear device 2302 may help better distribute the weight and heat generated by the power source 2335.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 2400 in FIG. 24, that mostly or completely covers a user's field of view. The virtual-reality system 2400 may include a front rigid body 2402 and a band 2404 shaped to fit around a user's head. The virtual-reality system 2400 may also include output audio transducers 2406(A) and 2406(B). Furthermore, while not shown in FIG. 24, the front rigid body 2402 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in the augmented-reality system 2000 and/or the virtual-reality system 2400 may include one or more liquid crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the augmented-reality system 2300 and/or the virtual-reality system 2400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. the Artificial-reality systems may also be configured with any other suitable type or form of image projection system.

Artificial-reality systems may also include various types of computer vision components and subsystems. For example, the augmented-reality system 2200, the augmented-reality system 2300, and/or the virtual-reality system 2400 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 22 and 24, the output audio transducers 2208(A), 2208(B), 2406(A), and 2406(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 2210 of FIG. 19 may include condenser microphones, dynamic microphones, ribbon microphones, and/or any other type or form of input transducer. In some embodiments, a single transducer may be used for both audio input and audio output.

Figure 24:
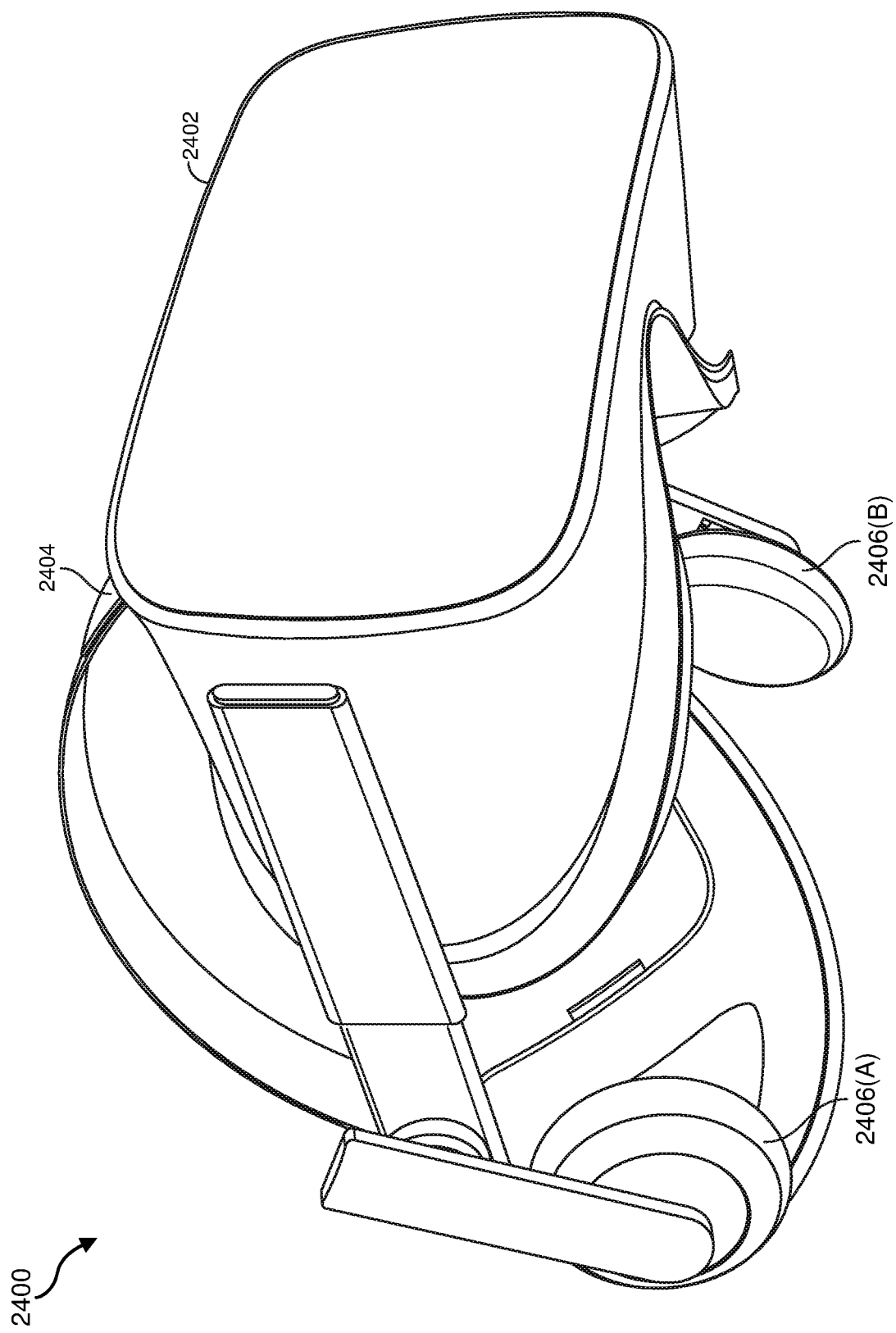
FIG. 24 is an illustration of an example virtual-reality headset that may be used in connection with embodiments of this disclosure.

While not shown in FIGS. 22-24, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, the artificial-reality systems 2200, 2300, and 2400 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 25:
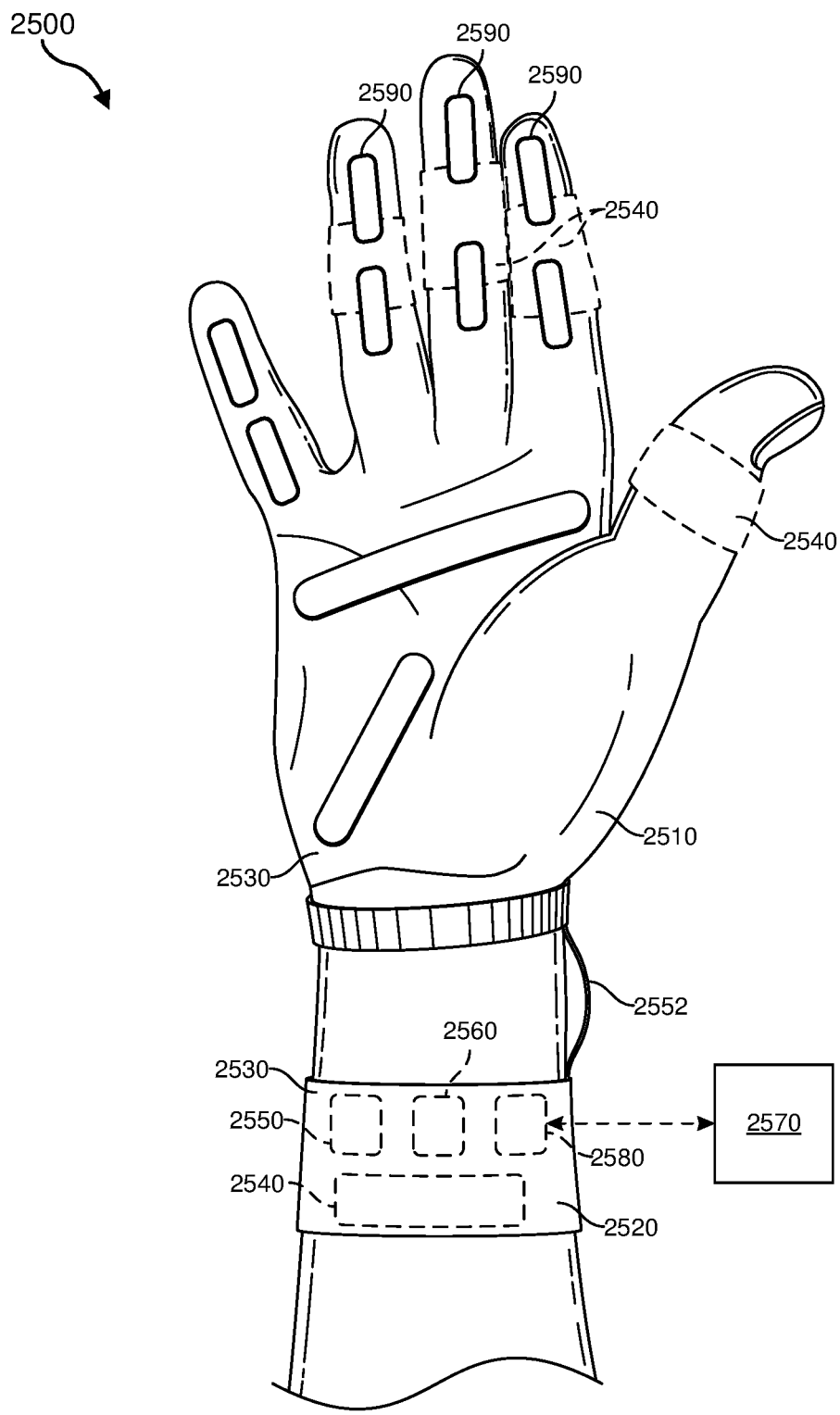
FIG. 25 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 25 illustrates a vibrotactile system 2500 in the form of a wearable glove (haptic device 2510) and wristband (haptic device 2520). The haptic device 2510 and the haptic device 2520 are shown as examples of wearable devices that include a flexible, wearable textile material 2530 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 2540 may be positioned at least partially within one or more corresponding pockets formed in the textile material 2530 of the vibrotactile system 2500. The vibrotactile devices 2540 may be positioned in locations to provide a vibrating sensation (e.g., haptic feedback) to a user of the vibrotactile system 2500. For example, the vibrotactile devices 2540 may be positioned to be against the user's finger(s), thumb, or wrist, as shown in FIG. 25. The vibrotactile devices 2540 may, in some examples, be sufficiently flexible to conform to or bend with the user's corresponding body part(s).

A power source 2550 (e.g., a battery) for applying a voltage to the vibrotactile devices 2540 for activation thereof may be electrically coupled to the vibrotactile devices 2540, such as via conductive wiring 2552. In some examples, each of the vibrotactile devices 2540 may be independently electrically coupled to the power source 2550 for individual activation. In some embodiments, a processor 2560 may be operatively coupled to the power source 2550 and configured (e.g., programmed) to control activation of the vibrotactile devices 2540. In additional embodiments, one or more of the vibrotactile devices 2240 may include or be replaced by fluidic devices that may inflate, deflate, vibrate, or pulse upon activation.

The vibrotactile system 2500 may be implemented in a variety of ways. In some examples, the vibrotactile system 2500 may be a standalone system with integral subsystems and components for operation independent of other devices and systems. As another example, the vibrotactile system 2500 may be configured for interaction with another device or system 2570. For example, the vibrotactile system 2500 may, in some examples, include a communications interface 2580 for receiving and/or sending signals to the other device or system 2570. The other device or system 2570 may be a mobile device, a gaming console, an artificial reality (e.g., virtual reality, augmented reality, mixed reality) device, a personal computer, a tablet computer, a network device (e.g., a modem, a router, etc.), a handheld controller, etc. The communications interface 2580 may enable communications between the vibrotactile system 2500 and the other device or system 2570 via a wireless (e.g., Wi-Fi, Bluetooth, cellular, radio, etc.) link or a wired link. If present, the communications interface 2580 may be in communication with the processor 2560, such as to provide a signal to the processor 2560 to activate or deactivate one or more of the vibrotactile devices 2540.

The vibrotactile system 2500 may optionally include other subsystems and components, such as touch-sensitive pads 2590, pressure sensors, motion sensors, position sensors, lighting elements, and/or user interface elements (e.g., an on/off button, a vibration control element, etc.). During use, the vibrotactile devices 2540 may be configured to be activated for a variety of different reasons, such as in response to the user's interaction with user interface elements, a signal from the motion or position sensors, a signal from the touch-sensitive pads 2590, a signal from the pressure sensors, a signal from the other device or system 2570, etc.

Although the power source 2550, the processor 2560, and the communications interface 2580 are illustrated in FIG. 25 as being positioned in the haptic device 2520, the present disclosure is not so limited. For example, one or more of the power source 2550, the processor 2560, or the communications interface 2580 may be positioned within the haptic device 2510 or within another wearable textile.

Figure 26:
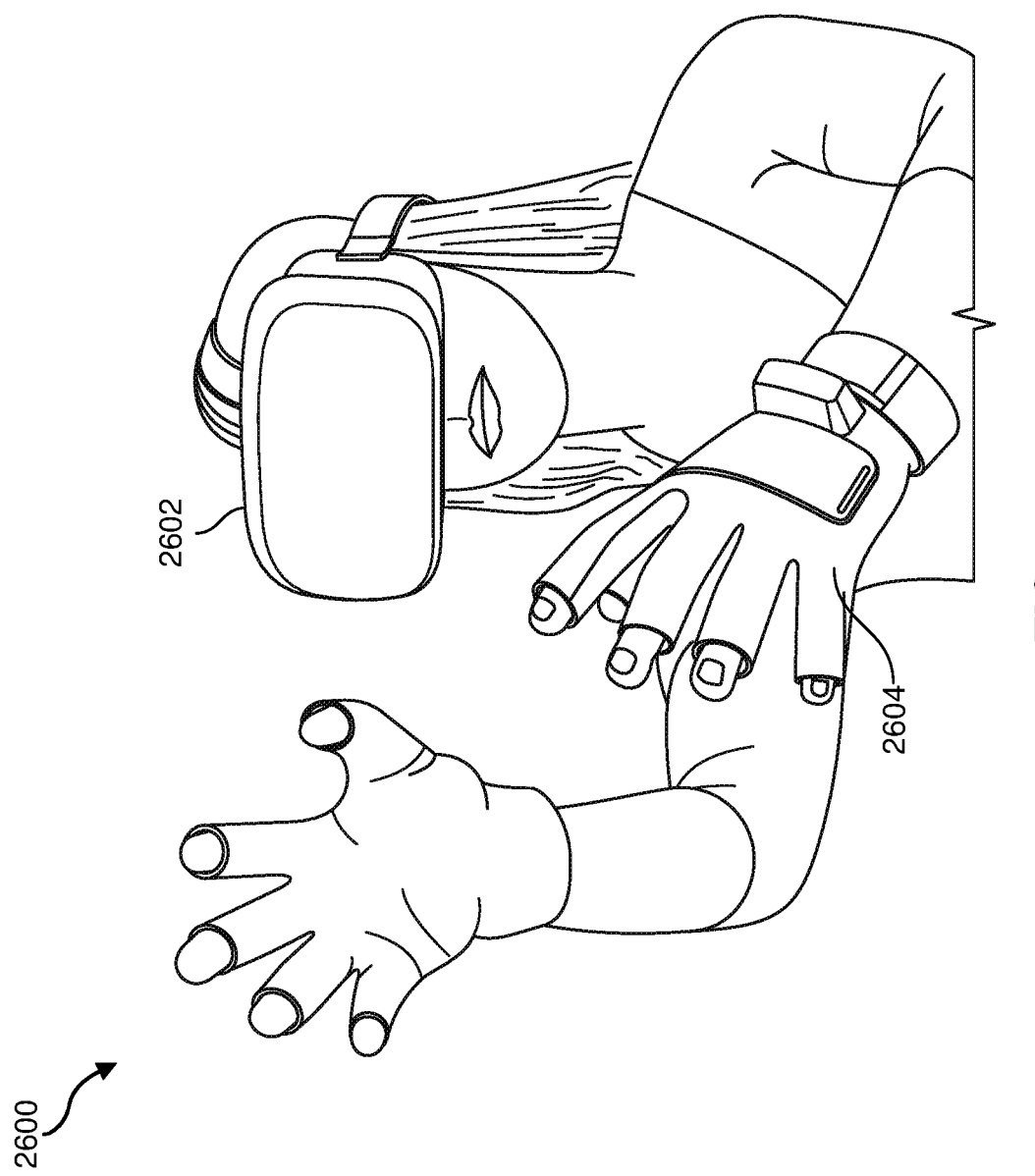
FIG. 26 is an illustration of an example virtual-reality environment according to embodiments of this disclosure.

Haptic wearables, such as those shown in and described in connection with FIG. 25, may be implemented in a variety of types of artificial-reality systems and environments. FIG. 26 shows an example artificial-reality environment 2600 including one head-mounted virtual-reality display 2302 and two haptic devices 2304 (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

The head-mounted display 2602 generally represents any type or form of virtual-reality system, such as the virtual-reality system 2400 in FIG. 24. The haptic device 2604 generally represents any type or form of wearable device, worn by a use of an artificial-reality system, that provides haptic feedback to the user to give the user the perception that he or she is physically engaging with a virtual object. In some embodiments, the haptic device 2604 may provide haptic feedback by applying vibration, motion, and/or force to the user. For example, the haptic device 2604 may limit or augment a user's movement. To give a specific example, the haptic device 2604 may limit a user's hand from moving forward so that the user has the perception that his or her hand has come in physical contact with a virtual wall. In this specific example, one or more actuators within the haptic device 2304 may achieve the physical-movement restriction by pumping fluid into an inflatable bladder of the haptic device. In some examples, a user may also use the haptic device 2604 to send action requests to a console. Examples of action requests include, without limitation, requests to start an application and/or end the application and/or requests to perform a particular action within the application.

Figure 27:
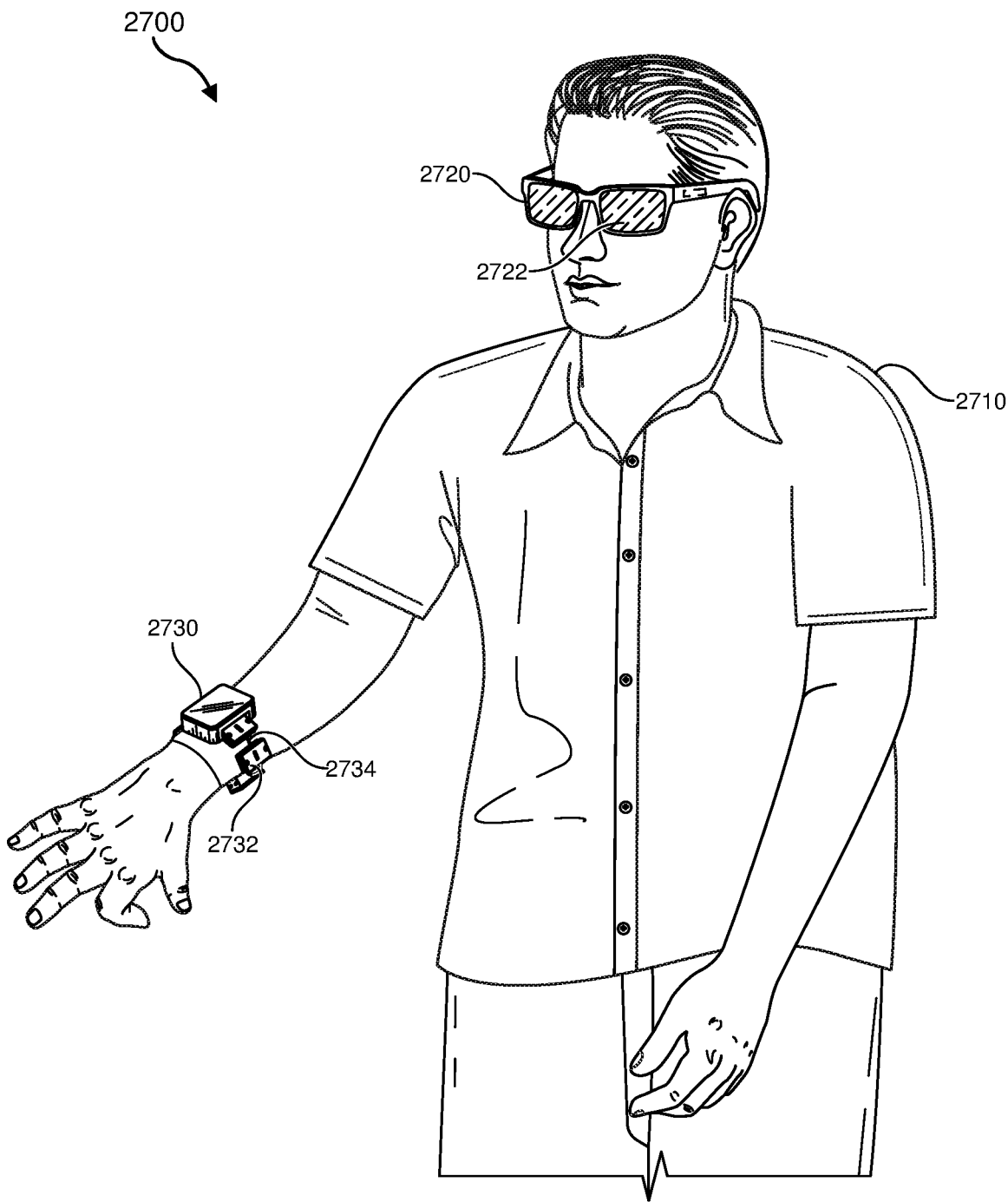
FIG. 27 is an illustration of an example augmented-reality environment according to embodiments of this disclosure.

While haptic interfaces may be used with virtual-reality systems, as shown in FIG. 26, haptic interfaces may also be used with augmented-reality systems, as shown in FIG. 27. FIG. 27 is a perspective view of a user 2710 interacting with an augmented-reality system 2700. In this example, the user 2710 may wear a pair of augmented-reality glasses 2720 that have one or more displays 2722 and that are paired with a haptic device 2730. The haptic device 2730 may be a wristband that includes a plurality of band elements 2732 and a tensioning mechanism 2734 that connects the band elements 2732 to one another.

One or more of the band elements 2732 may include any type or form of actuator suitable for providing haptic feedback. For example, one or more of the band elements 2732 may be configured to provide one or more of various types of cutaneous feedback, including vibration, force, traction, texture, and/or temperature. To provide such feedback, the band elements 2732 may include one or more of various types of actuators. In one example, each of the band elements 2732 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 2510, 2520, 2604, and 2730 may include any suitable number and/or type of haptic transducer, sensor, and/or feedback mechanism. For example, the haptic devices 2510, 2520, 2604, and 2730 may include one or more mechanical transducers, piezoelectric transducers, and/or fluidic transducers. The haptic devices 2510, 2520, 2604, and 2730 may also include various combinations of different types and forms of transducers that work together or independently to enhance a user's artificial-reality experience. In one example, each of the band elements 2732 of the haptic device 2730 may include a vibrotactor (e.g., a vibrotactile actuator) configured to vibrate in unison or independently to provide one or more of various types of haptic sensations to a user.

The following examples are also included in the present disclosure.

Example 1: A magnetic fluidic valve, which may include: a valve body having at least one cavity therein; a gate transmission element disposed within the cavity and configured to move between a closed position and an open position, the gate transmission element comprising a ferromagnetic material; an inlet port in fluid communication with the cavity; an outlet port in fluid communication with the cavity; a permanent magnet positioned and configured to bias the gate transmission element to the closed position with a magnetic force; and an electromagnetic coil configured to, upon actuation, overcome the magnetic force acting on the gate transmission element from the permanent magnet, wherein the gate transmission element is configured to move from the closed position blocking the inlet port to the open position unblocking the inlet port upon actuation of the electromagnetic coil.

Example 2: The magnetic fluidic valve of Example 1, which may further include another permanent magnet positioned and configured to bias the gate transmission element to the open position.

Example 3: The magnetic fluidic valve of Example 2, which may further include another electromagnetic coil configured to, upon actuation, overcome a magnetic force acting on the gate transmission element from the other permanent magnet to enable the gate transmission element to move from the open position to the closed position.

Example 4: The magnetic fluidic valve of any of Examples 1 through 3, which may further include an exhaust port in fluid communication with the cavity.

Example 5: The magnetic fluidic valve of Example 4, which may further include an exhaust boot positioned over the exhaust port.

Example 6: The magnetic fluidic valve of Example 4 or 5, wherein the inlet port, the outlet port, and the exhaust port are each oriented about 120 degrees from one another.

Example 7: The magnetic fluidic valve of any of Examples 1 through 6, wherein the magnetic fluidic valve fits within an area of about 1000 $mm^2$.

Example 8: The magnetic fluidic valve of any of Examples 1 through 7, wherein the magnetic fluidic valve fits within an area of about 125 $mm^2$.

Example 9: The magnetic fluidic valve of any of Examples 1 through 8, wherein the gate transmission element is substantially spherical.

Example 10: A magnetic fluidic system, which may include: a magnetic fluidic valve, including: an inlet port for conveying a subject fluid into a cavity; an outlet port for conveying the subject fluid out of the cavity; a gate transmission element including a ferromagnetic material that is shaped and sized to block at least one of the inlet port or the outlet port in a closed position and to allow the subject fluid to flow from the inlet port to the outlet port in an open position; a permanent magnet positioned and configured to apply a magnetic force to the gate transmission element sufficient to maintain the gate transmission element in the closed position; and an electromagnetic coil positioned and configured to, upon actuation, overcome the magnetic force to allow the gate transmission element to move from the closed position to the open position; and a fluid-driven mechanism in fluid communication with the outlet port.

Example 11: The magnetic fluidic system of Example 10, wherein the fluid-driven mechanism includes at least one of: a microelectromechanical device; an expansible cavity; a piston system; or a haptic feedback device.

Example 12: The magnetic fluidic system of Example 10 or 11, which may further include a substrate comprising at least one fluid channel in fluid communication with the inlet port.

Example 13: The magnetic fluidic system of Example 12, wherein the substrate is substantially planar.

Example 14: The magnetic fluidic system of Example 12 or 13, wherein the substrate includes at least one of: a printed circuit board; a semiconductor substrate; a ceramic substrate; a metallic substrate; a glass substrate; or a polymeric substrate.

Example 15: The magnetic fluidic system of any of Examples 10 through 14, which may further include a removable electronic-magnetics module that includes the permanent magnet and the electromagnetic coil.

Example 16: The magnetic fluidic system of any of Examples 10 through 15, wherein the electromagnetic coil is a flexible circuit element.

Example 17: A method of controlling flow of a subject fluid in a magnetic fluidic system, wherein the method may include: conveying a subject fluid through a cavity of a fluidic valve from an inlet port to an outlet port; applying a magnetic force to a ferromagnetic gate transmission element positioned within the cavity with a permanent magnet to move the gate transmission element from an open position unblocking the inlet port to a closed position blocking the inlet port to inhibit the conveyance of the subject fluid through the cavity from the inlet port to the outlet port; and actuating an electromagnetic coil to sufficiently overcome the magnetic force applied by the permanent magnet to move the gate transmission element from the closed position to the open position to resume conveyance of the subject fluid through the cavity from the inlet port to the outlet port.

Example 18: The method of Example 17, which may further include applying another magnetic force to the gate transmission element with another permanent magnet to maintain the gate transmission element in the open position.

Example 19: The method of Example 18, which may further include actuating another electromagnetic coil to sufficiently overcome the other magnetic force applied by the other permanent magnet to move the gate transmission element from the open position to the closed position to again inhibit conveyance of the subject fluid through the cavity from the inlet port to the outlet port.

Example 20: The method of any of Examples 17 through 19, which may further include activating, with the subject fluid, a fluid-driven mechanism in fluid communication with the outlet port.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A magnetic fluidic valve, comprising:
    a valve body having at least one cavity therein;
    a gate transmission element disposed within the cavity and configured to move between a closed position and an open position, the gate transmission element comprising a ferromagnetic material;
    an inlet port in fluid communication with the cavity;
    an outlet port in fluid communication with the cavity;
    an exhaust port in fluid communication with the cavity, wherein the exhaust port is configured to release a pressurized subject fluid from the outlet port when the gate transmission element is in the closed position;
    a permanent magnet positioned and configured to bias the gate transmission element to the closed position with a magnetic force;
    an electromagnetic coil configured to, upon actuation, overcome the magnetic force acting on the gate transmission element from the permanent magnet; and
    a sheath positioned over an outer surface of the valve body and under the permanent magnet and electromagnetic coil, wherein:
        the sheath is configured to modify a magnetic flux of the permanent magnet and electromagnetic coil,
        the permanent magnet and the electromagnetic coil are positioned to at least partially surround the valve body, and
        the gate transmission element is configured to move from the closed position blocking the inlet port to the open position unblocking the inlet port upon actuation of the electromagnetic coil.

2. The magnetic fluidic valve of claim 1, further comprising another permanent magnet positioned and configured to bias the gate transmission element to the open position.

3. The magnetic fluidic valve of claim 2, further comprising another electromagnetic coil configured to, upon actuation, overcome a magnetic force acting on the gate transmission element from the other permanent magnet to enable the gate transmission element to move from the open position to the closed position.

4. The magnetic fluidic valve of claim 3, wherein:
    the valve body comprises the outlet port; and
    the other permanent magnet and the other electromagnetic coil are positioned to surround the outlet port.

5. The magnetic fluidic valve of claim 3, wherein:
    the valve body further comprises the exhaust port; and
    the other permanent magnet and the other electromagnetic coil are positioned to surround the exhaust port.

6. The magnetic fluidic valve of claim 1, wherein the inlet port, the outlet port, and the exhaust port are each oriented about 120 degrees from one another.

7. The magnetic fluidic valve of claim 1, wherein the magnetic fluidic valve fits within an area of about 1000 mm$^2$.

8. The magnetic fluidic valve of claim 7, wherein the magnetic fluidic valve fits within an area of about 125 mm$^2$.

9. The magnetic fluidic valve of claim 1, wherein the gate transmission element is substantially spherical.

10. The magnetic fluidic valve of claim 1, wherein the gate transmission element blocks flow through the exhaust port when the gate transmission element is in the open position.

11. The magnetic fluidic valve of claim 1, further comprising an exhaust boot positioned over the exhaust port.

12. The magnetic fluidic valve of claim 1, further comprising a covering positioned over the permanent magnet and the electromagnetic coil.

13. The magnetic fluidic valve of claim 1, wherein:
    the valve body comprises the inlet port; and the permanent magnet and the electromagnetic coil are positioned to surround the inlet port.

* * * * *